(12) United States Patent
Nicol

(10) Patent No.: US 10,719,470 B2
(45) Date of Patent: Jul. 21, 2020

(54) RECONFIGURABLE FABRIC DIRECT MEMORY ACCESS WITH MULTIPLE READ OR WRITE ELEMENTS

(71) Applicant: Wave Computing, Inc., Campbell, CA (US)

(72) Inventor: Christopher John Nicol, Campbell, CA (US)

(73) Assignee: Wave Computing, Inc., Santa Clara, CA (US)

( * ) Notice: Subject to any disclaimer, the term of this patent is extended or adjusted under 35 U.S.C. 154(b) by 0 days.

(21) Appl. No.: 15/712,494

(22) Filed: Sep. 22, 2017

(65) Prior Publication Data

US 2018/0089128 A1    Mar. 29, 2018

Related U.S. Application Data

(60) Provisional application No. 62/399,785, filed on Sep. 26, 2016, provisional application No. 62/399,948, (Continued)

(51) Int. Cl.
*G06F 13/40* (2006.01)
*G06F 13/28* (2006.01)
(Continued)

(52) U.S. Cl.
CPC ...... *G06F 13/4022* (2013.01); *G06F 13/1673* (2013.01); *G06F 13/1694* (2013.01); (Continued)

(58) Field of Classification Search
CPC .. G06F 13/28; G06F 13/1673; G06F 13/1694; G06F 13/4022; G06F 13/287; G06F 13/4221
See application file for complete search history.

(56) References Cited

U.S. PATENT DOCUMENTS

| 5,247,671 A | 9/1993 | Adkins et al. |
| 6,134,605 A | 10/2000 | Hudson et al. |

(Continued)

FOREIGN PATENT DOCUMENTS

| JP | 2005165961 A | 12/2003 |
| WO | WO2009131569 A1 | 10/2009 |

OTHER PUBLICATIONS

International Search Report dated Feb. 6, 2015 for PCT/US2014/063591.

(Continued)

*Primary Examiner* — Nimesh G Patel
(74) *Attorney, Agent, or Firm* — Adams Intellex, PLC

(57) ABSTRACT

Techniques are disclosed for data manipulation. Data is obtained from a first switching element where the first switching element is controlled by a first circular buffer. Data is sent to a second switching element where the second switching element is controlled by a second circular buffer. Data is controlled by a third switching element that is controlled by a third circular buffer. The third switching element hierarchically controls the first switching element and the second switching element. Data is routed through a fourth switching element that is controlled by a fourth circular buffer. The circular buffers are statically scheduled. The obtaining data from a first switching element and the sending the data to a second switching element includes a direct memory access (DMA). The switching elements can operate as a master controller or as a slave device. The switching elements can comprise clusters within an asynchronous reconfigurable fabric.

25 Claims, 11 Drawing Sheets

Related U.S. Application Data filed on Sep. 26, 2016, provisional application No. 62/399,964, filed on Sep. 26, 2016, provisional application No. 62/440,248, filed on Dec. 29, 2016.

(51) Int. Cl.
  *G06F 13/16* (2006.01)
  *G06F 13/42* (2006.01)

(52) U.S. Cl.
  CPC .......... *G06F 13/28* (2013.01); *G06F 13/287* (2013.01); *G06F 13/4221* (2013.01)

(56) References Cited

U.S. PATENT DOCUMENTS

| | | |
|---|---|---|
| 6,363,470 B1 | 3/2002 | Laurenti et al. |
| 7,420,390 B1 | 9/2008 | Hutton et al. |
| 8,078,839 B2 | 12/2011 | Fant |
| 8,314,636 B2 | 11/2012 | Hutton et al. |
| 8,341,469 B2 | 12/2012 | Miyama et al. |
| 9,092,305 B1 | 7/2015 | Blott et al. |
| 9,128,817 B2 | 9/2015 | Kim et al. |
| 9,602,432 B2 | 3/2017 | Lee et al. |
| 9,774,499 B2 | 9/2017 | Christenson et al. |
| 2002/0184241 A1 | 12/2002 | Wu |
| 2003/0061240 A1 | 3/2003 | McCann et al. |
| 2004/0120189 A1 | 6/2004 | Schauer |
| 2006/0206635 A1 | 9/2006 | Alexander et al. |
| 2007/0133399 A1 | 6/2007 | Gangwal |
| 2008/0250225 A1 | 10/2008 | Chester |
| 2009/0089605 A1 | 4/2009 | Westwick et al. |
| 2010/0013517 A1* | 1/2010 | Manohar .......... H03K 19/17728 326/38 |
| 2010/0115322 A1 | 5/2010 | Petrick |
| 2010/0281448 A1 | 11/2010 | He |
| 2011/0167189 A1 | 7/2011 | Matsubara et al. |
| 2011/0199117 A1 | 8/2011 | Hutchings et al. |
| 2012/0119781 A1 | 5/2012 | Manohar et al. |
| 2012/0235839 A1 | 9/2012 | Mazumdar et al. |
| 2012/0290810 A1 | 11/2012 | Lecler et al. |
| 2012/0319730 A1 | 12/2012 | Fitton et al. |
| 2013/0009666 A1 | 1/2013 | Hutton et al. |
| 2013/0009667 A1 | 1/2013 | Calhoun et al. |
| 2013/0043902 A1 | 2/2013 | Rahim et al. |
| 2014/0075144 A1 | 3/2014 | Sanders et al. |
| 2014/0223462 A1 | 8/2014 | Aimone et al. |
| 2014/0281385 A1 | 9/2014 | Tu |
| 2015/0123707 A1* | 5/2015 | Nicol ............... H03K 19/01758 326/41 |
| 2015/0317252 A1 | 11/2015 | Kannan |
| 2015/0324690 A1 | 11/2015 | Chilimbi et al. |
| 2015/0339570 A1 | 11/2015 | Scheffler |
| 2016/0139807 A1 | 5/2016 | Lesartre et al. |
| 2016/0180239 A1 | 6/2016 | Frankel et al. |
| 2016/0277817 A1 | 9/2016 | Lee et al. |

OTHER PUBLICATIONS

Stratix II Device Handbook, vol. 1, published by Altera Corporation © May 2007.

Hybrid Memory Cube Specification 2.1, published by Altera Corporation © Nov. 2014.

J. Thomas Pawlowski, Hybrid Memory Cube, published by Micron Technology Inc. © Aug. 4, 2011.

* cited by examiner

RECONFIGURABLE FABRIC DIRECT MEMORY ACCESS WITH MULTIPLE READ OR WRITE ELEMENTS

RELATED APPLICATIONS

This application claims the benefit of U.S. provisional applications "Direct Memory Access within a Reconfigurable Fabric" Ser. No. 62/399,785, filed Sep. 26, 2016, "Reconfigurable Fabric Direct Memory Access" Ser. No. 62/399,948, filed Sep. 26, 2016, "Reconfigurable Fabric Accessing External Memory" Ser. No. 62/399,964, filed Sep. 26, 2016, and "Reconfigurable Fabric Direct Memory Access with Multiple Read or Write Elements" Ser. No. 62/440,248, filed Dec. 29, 2016.

Each of the foregoing applications is hereby incorporated by reference in its entirety.

FIELD OF ART

This application relates generally to direct memory access (DMA) and more particularly to reconfigurable fabric direct memory access with multiple read or write elements.

BACKGROUND

Integrated circuits or "chips" are ubiquitous in the modern electronic systems with which people interact on a daily basis. These chips are designed to perform a wide variety of functions in the electronic systems, and enable those systems to perform their functions effectively and efficiently. The chips are based on highly complex circuit designs, system architectures and implementations, and are integral to the electronic systems. The chips implement functions such as communications, processing, and networking, whether the electronic systems are applied to business, entertainment, or consumer electronics purposes. The electronic systems routinely contain more than one chip. The chips implement critical functions including computation, storage, and control. The chips support the electronic systems by computing algorithms and heuristics, handling and processing data, communicating internally and externally to the electronic system, and so on. Since there are numerous computations that must be performed, any improvements in the efficiency of the computations add up to form a significant and substantial impact on overall system performance. As the amount of data to be handled increases, the approaches that are used must not only be effective, efficient, and economical, but must also scale as the amount of data increases.

Single processor architectures are well-suited for some tasks, but are unable to provide the level of performance required by some high-performance systems. Parallel processing based on general-purpose processors can attain an increased level of performance. Thus, using systems with multiple processing elements is one approach for achieving increased performance. There is a wide variety of applications that demand a high level of performance. Such applications can include networking, image processing, simulations, and signal processing, to name a few. In addition to computing power, flexibility is also important for adapting to ever-changing business needs and technical situations.

The nature of some applications demands reconfigurability. Reconfigurability is an important attribute in many processing applications, as reconfigurable devices are extremely efficient for certain types of processing tasks. In certain circumstances, the main reason why cost and performance advantages of reconfigurable devices exist is that reconfigurable logic enables program parallelism, allowing for multiple computation operations to occur simultaneously for the same program. Meanwhile, conventional processors are often limited by instruction bandwidth and execution restrictions. Typically, the high-density properties of reconfigurable devices come at the expense of the high-diversity property that is inherent in microprocessors. Microprocessors have evolved to a highly-optimized configuration that can provide cost/performance advantages over reconfigurable arrays for certain tasks with high functional diversity. However, there are many tasks for which a conventional microprocessor may not be the best design choice. An architecture supporting configurable interconnected processing elements can be a viable alternative in many data intensive applications, especially for moving and processing incredibly large amounts of data. Data-driven applications demand a whole new architecture of computing structures to meet the throughput and processing needs contained therein.

The emergence of reconfigurable computing has enabled a higher level of both flexibility and performance in computer systems. Reconfigurable computing combines the high speed of application-specific integrated circuits (ASIC) with the flexibility of programmable processors. This provides much-needed functionality and power to enable the technology used in many current and upcoming fields.

SUMMARY

Disclosed embodiments provide for improved data manipulation performance by enhancing direct memory access (DMA) communication between switching elements or clusters of switching elements. Data is obtained from a first switching element within a plurality of switching elements. The first switching element is controlled by a first circular buffer. The data is sent to a second switching element within the plurality of switching elements. The second switching element is controlled by a second circular buffer. The obtaining the data from the first switching element and the sending the data to the second switching element comprise a direct memory access (DMA). The first switching element and the second switching element can be controlled by a third switching element within the plurality of switching elements.

Reconfigurable arrays or clusters of processing elements, switching elements, etc., have many applications where high speed transferring and processing of data is advantageous. Interfaces to the clusters can support multiple master/slave interfaces, where a master processing element can control data transfer, and a slave processing element can be a reader (sink of data) or a writer (source of data). The interfaces are coupled to first in first out (FIFO) blocks that provide the interfaces with custom logic and alignment between the FIFO channels and a static schedule of a row or a column of the clusters. The slave interfaces can load programs into the clusters. Each interface can be connected to various configuration paths, where each path is buffered to support independent and concurrent operations.

In embodiments, the first plurality of switching elements comprises a hum generation fabric. The hum generation fabric can operate at a hum frequency. In embodiments, the plurality of switching elements comprises an asynchronous reconfigurable fabric. The asynchronous reconfigurable fabric can be self-timed. The asynchronous reconfigurable fabric can be asynchronous with respect to system memory. In embodiments, the plurality of switching elements forms two or more clusters within a reconfigurable fabric. Some embodiments further comprise a third switching element within the plurality of switching elements, wherein the third switching element hierarchically controls the first switching element and the second switching element. Some embodiments further comprise a fourth switching element within the plurality of switching elements, wherein the fourth switching element is controlled by a fourth circular buffer.

Disclosed is a processor-implemented method for data manipulation comprising: obtaining data from a first switching element within a plurality of switching elements wherein the first switching element is controlled by a first circular buffer; and sending the data to a second switching element within the plurality of switching elements wherein the second switching element is controlled by a second circular buffer. In embodiments, a computer program product embodied in a non-transitory computer readable medium for data manipulation comprising code which causes one or more processors to perform operations of: obtaining data from a first switching element within a plurality of switching elements wherein the first switching element is controlled by a first circular buffer; and sending the data to a second switching element within the plurality of switching elements wherein the second switching element is controlled by a second circular buffer.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
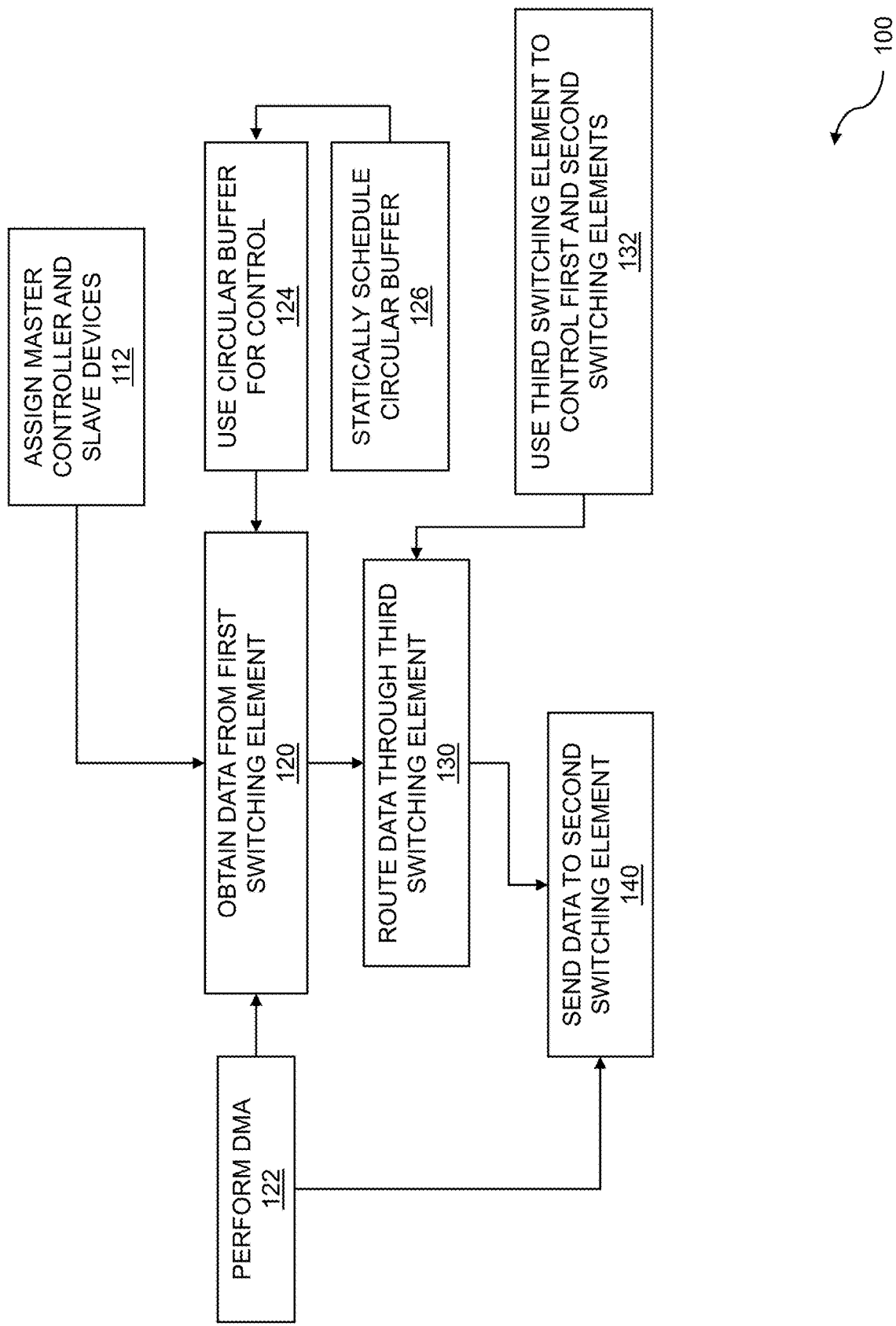
FIG. 1 is a flow diagram for data manipulation.

Techniques are disclosed for data manipulation. The needs of commercial, military, and other market segments compel the electronics and semiconductor industries to improve the semiconductor chips and systems that they design, develop, implement, fabricate, and deploy. Improvements of the semiconductor chips are measured based on many factors including design criteria such as the price, dimensions, speed, power consumption, heat dissipation, feature sets, compatibility, etc. These chip measurements find their ways into designs of the semiconductor chips and the capabilities of the electronic systems that are built from the chips. The semiconductor chips and systems are deployed in many market segments including commercial, medical, consumer, educational, financial, etc. The applications include computation, digital communications, control and automation, etc., naming only a few. The abilities of the chips to perform basic logical operations and to process data, at high speed, are fundamental to any of the chip and system applications. The abilities of the chips to transfer very large data sets have become particularly critical because of the demands of many applications.

Chip, system, and computer architectures have traditionally relied on controlling the flow of data through the chip, system, or computer. In these architectures, such as the classic Von Neumann architecture where memory is shared for storing instructions and data, a set of instructions is executed to process data. With such an architecture, referred to as a "control flow", the execution of the instructions can be predicted and can be deterministic. That is, the way in which data is processed is dependent upon the point in a set of instructions at which a chip, system, or computer is operating. In contrast, a "dataflow" architecture is one in which the data controls the order of operation of the chip, system, or computer. The dataflow control can be determined by the presence or absence of data. Dataflow architectures find applications in many areas including the fields of networking and digital signal processing, as well as other areas in which large data sets must be handled such as telemetry and graphics processing.

Direct memory access (DMA) can be applied to improve communication between processing elements, switching elements, and so on of a fabric or cluster of such elements. Since communication such as the transfer of data from one location to another location can be a limiting factor in system performance, increased communication rate and efficiency can directly impact overall performance and speed. Data is obtained from a first switching element within a plurality of switching elements. The first switching element is controlled by a first circular buffer. The data is sent to a second switching element within the plurality of switching elements. The second switching element is controlled by a second circular buffer. The obtaining data from the first switching element and the sending data to the second switching element include a direct memory access (DMA). The first switching element and the second switching element can be controlled hierarchically by a third switching element within the plurality of switching elements.

Dataflow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Dataflow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on dataflow processors. The dataflow processor can receive a dataflow graph such as an acyclic dataflow graph, where the dataflow graph can represent a deep learning network. The dataflow graph can be assembled at runtime, where assembly can include calculation input/output, memory input/output, and so on. The assembled dataflow graph can be executed on the dataflow processor.

The dataflow processors can be organized in a variety of configurations. One configuration can include processing element quads with arithmetic units. A dataflow processor can include one or more processing elements (PE). The processing elements can include a processor, a data memory, an instruction memory, communications capabilities, and so on. Multiple PEs can be grouped, where the groups can include pairs, quads, octets, etc. The PEs arranged in arrangements such as quads can be coupled to arithmetic units, where the arithmetic units can be coupled to or included in data processing units (DPU). The DPUs can be shared between and among quads. The DPUs can provide arithmetic techniques to the PEs, communications between quads, and so on.

The dataflow processors, including dataflow processors arranged in quads, can be loaded with kernels. The kernels can be a portion of a dataflow graph. In order for the dataflow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value −1 plus the Manhattan distance from a given PE in a cluster to the end of the cluster. A Manhattan distance can include a number of steps to the east, west, north, and south. A control signal can be propagated from the start cluster to the end cluster. The control signal advances 1 cluster per cycle. When the counters for the PEs all reach 0 then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Various techniques, including direct memory access (DMA) can be used to load instructions from the kernel into instruction memories of the PEs. The clusters that were pre-programmed into configuration mode can be preprogrammed to exit configuration mode. When configuration mode has been exited, execution of the one or more kernels loaded onto the clusters can commence. In embodiments, clusters can be reprogrammed and during the reprogramming switch instructions used for routing are not interfered with so that routing continues through a cluster.

Dataflow processes that can be executed by dataflow processor can be managed by a software stack. A software stack can include a set of subsystems, including software subsystems, which may be needed to create a software platform. A complete software platform can include a set of software subsystems required to support one or more applications. A software stack can include offline operations and online operations. Offline operations can include software subsystems such as compilers, linker simulators, emulators, and so on. The offline software subsystems can be included in a software development kit (SDK). The online operations can include dataflow partitioning, dataflow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a dataflow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so one. The agent source code that can be operated on by the software development kit can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the dataflow processor or processors. The software development kit can include a variety of tools which can be used to support a deep learning technique or other technique which requires processing of large amounts of data such as unstructured data. The SDK can support multiple machine learning techniques such as machine learning techniques based on GEMM™, sigmoid, and so on. The SDK can include a low-level virtual machine (LLVM) which can serve as a front end to the SDK. The SDK can include a simulator. The SDK can include a Boolean satisfiability solver (SAT solver). The SDK can include an architectural simulator, where the architectural simulator can simulate a dataflow processor or processors. The SDK can include an assembler, where the assembler can be used to generate object modules. The object modules can represent agents. The agents can be stored in a library of agents. Other tools can be included in the SDK. The various techniques of the SDK can operate on various representations of a flow graph.

An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so one. The agent source code that can be operated on by the software development kit (SDK) can be in an agent library. The agent source code that has been operated on can include functions, algorithms, heuristics, etc., that can be used to implement a deep learning system.

Direct memory access (DMA) can be applied to improve communication between processing elements, switching elements etc. of a fabric or cluster of such elements. Since communication such as the transfer of data from one location to another location can be a limiting factor in system performance, increased communication rate and efficiency can directly impact speed and performance. In embodiments, a plurality of switching elements forms two or more clusters within a reconfigurable fabric. In embodiments, the two or more clusters are initialized to perform an operation based on one or more agents defined in a software development kit (SDK).

FIG. 1 is a flow diagram for data manipulation. Data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The flow 100 begins with assigning a master controller and slave devices 112. Any processing element or switching element can be assigned as a master controller. In embodiments, one of a first switching element or a second switching element can operate as a master controller. More than one master controller can be assigned. Other switching elements such as a third switching element can be assigned as the master controller. As is the case for assigning a master controller, one or more slave devices can be assigned. One of the first switching element or the second switching element can operate as a slave device. In embodiments, multiple switching elements can operate as slave units. That is, both the first switching element and/or the second switching element can operate as slave devices.

The flow 100 includes obtaining data from a first switching element 120 within a plurality of switching elements. The switching element from which data is obtained can be a master controller, a slave device operating as a writer, and so on. The plurality of switching elements can include a reconfigurable fabric. Any switching element within the plurality of switching elements can provide the data that is obtained. The flow 100 includes using a circular buffer for control 124, where the first switching element is controlled by a first circular buffer. The circular buffer can contain instructions, data, status bits, control bits, and so on. The first circular buffer and other circular buffers that can be used for control can be statically scheduled 126. The data that can be obtained from the first switching element can include a block of memory obtained from storage in the first switching element. The block of data can include bits, nibbles, bytes, words, etc. where the size can be any that is appropriate to the switching elements of the fabric. The block of memory can include a beginning address in the storage, where the storage is coupled to the first switching element. In order to indicate the end of the block of storage to be used for obtaining data from the first switching element, the block of memory can include an ending address in the storage. To support the obtaining data from the first switching element, the beginning address and the ending address of the block of memory can be stored with instructions in the first circular buffer. The flow 100 includes performing a direct memory access (DMA) 122. The direct memory access can include accessing memory that can be associated with the first switching element, with a second switching element, with a third switching element, and so on. The DMA can support obtaining the block of data. In embodiments, a processor-implemented method for data manipulation is disclosed comprising: obtaining data from a first switching element within a plurality of switching elements wherein the first switching element is controlled by a first circular buffer; and sending the data to a second switching element within the plurality of switching elements wherein the second switching element is controlled by a second circular buffer. In embodiments, a third switching element within the plurality of switching elements hierarchically controls the first switching element and the second switching element.

The flow 100 includes routing data through a third switching element 130 to a second switching element. When the first switching element and the second switching element are not immediate neighbors, such as neighbors located adjacently to the north, south, east, west, etc., then data obtained from the first switching element can be routed through one or more additional switching elements. Any numbers of other switching elements in the cluster can be used for routing data. The routing paths available can be predetermined and controlled according to a function that is being implemented within a reconfigurable fabric. The third switching element can be used to control the first and second switching elements 132. That is, the third switching element can operate as a master controller, and the first switching element and the second switching element can operate as slave devices. For example, the third switching element can control the first switching element that can be a writer slave device and control the second switching element that can be a reader slave device.

The flow 100 includes sending the data obtained from the first switching element to a second switching element 140 within the plurality of switching elements. As is the case for the first switching element and other switching elements, the second switching element is controlled by a second circular buffer. The second circular buffer can contain instructions, data, status bits, control bits, and so on, and can be statically scheduled. The obtaining data from the first switching element and the sending the data to the second switching element can include performing a direct memory access (DMA) 122. The second circular buffer can include a beginning address for a block of memory, an ending address for the block of memory, and so on. Various types of data can be obtained from the first switching element and sent to the second switching element. The data can include control and status bits, data bytes, data words, and so on. The data can include valid data or invalid data. The obtaining of data and the sending of data can be contingent upon the presence of valid data or the presence of invalid data. For example, the obtaining of data and the sending of data can be delayed, suspended, etc. while the data remains invalid, and then can proceed when the data becomes valid. The data can include occupied data or empty data. That is, blocks of memory can be occupied with data or not occupied with data. When empty data is "present" or indicated with a status indicator such as a status bit, then the obtaining of data and the sending of data can be suspended, delayed, sent into a sleep state, and so on. When data becomes occupied, then status can be woken from the sleep state and the obtaining data and sending data can proceed.

The obtaining data from a first switching element and the sending the data to a second switching element can be autonomous of a third switching element within the plurality of switching elements. The third switching element and other switching elements can be performing other operations, functions, etc., such as transferring data among themselves without interfering with nor interrupting the transfer of data between the first switching element and the second switching element. In embodiments, the obtaining of the data from the first switching element can be triggered by a start instruction stored in the first circular buffer. When the start instruction is executed, the data to be obtained can be determined to be valid data or invalid data, occupied data or empty data, and so on. In embodiments, data obtained from the first switching element and sent to the second switching element can be routed through a third switching element within the plurality of switching elements where the third switching element can be controlled by a third circular buffer. As before, the third circular buffer can include data, instructions, status and condition flags or bits, etc. The third switching element can be interposed between the first switching element and the second switching element. The third switching element can be physically located between the first switching element and the second switching element, can be switched in between the first and second switching elements, and so on. In embodiments, the first switching element and the second switching element are the same element. In embodiments, the first switching element and the third switching element are the same element. In embodiments, the second switching element and the third switching element are the same element. In embodiments, the first switching element, the second switching element, and the third switching element are the same element.

The circular buffers that control the switching elements can be rotated in order to access instructions, data, block addresses, etc. The rotating of the circular buffer can cause changes in the operation of the switching element. In embodiments, the first circular buffer dynamically can change operation of the first switching element based on the first circular buffer rotating. Rotating other circular buffers can dynamically change operations of other switching elements based on the circular buffer rotating. The circular buffers can rotate, or not rotate, independently of each other. The first circular buffer can be programmed and instructions can be pre-processed to provide instructions to the first circular buffer for dynamic programming. The other circular buffers can be similarly programmed and the instructions for the other circular buffers can be pre-processed. The dynamic programming can control the first switching element. Further, dynamically programming can control the second switching element, the third switching element, and so on. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figures 2A, 2B:
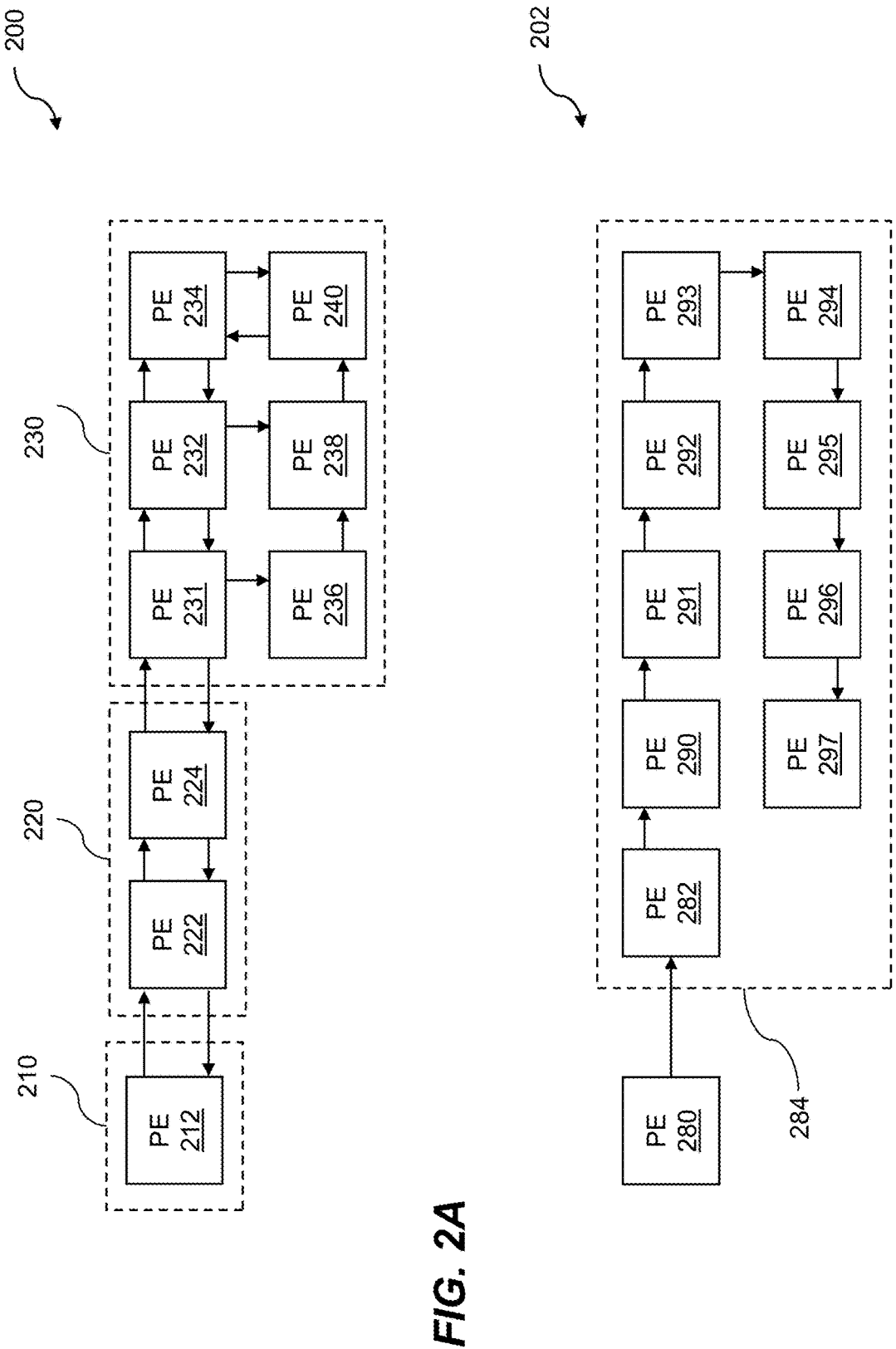
FIG. 2A illustrates DMA paths for transfers.
FIG. 2B illustrates DMA paths for posted write transfers.

FIG. 2A and FIG. 2B illustrate DMA paths for data transfers. Data can be obtained from a first switching unit, where the first switching unit can be controlled by a first circular buffer. Data can be sent to a second switching element, where the second switching element can be controlled by a second circular buffer. The obtaining data from the first switching element and the sending data to a second switching element can comprise a direct memory access (DMA). Processing elements and switching elements that are designated as masters can establish DMA paths for transfers 200, or DMA paths for transfers 202, to slaves. A master 210, comprising processing element 212, can establish a DMA path 220 that includes processing elements 222 and 224 to slave processing elements 230. The slave processing elements can include 231, 232, 234, 236, 238, and 240. The slave processing elements and switching elements can include readers and writers. A processing element can comprise an interconnected "quad" of processing elements, often referred to simply as a quad or a cluster. A cluster can comprise a single quad or multiple single quad clusters, depending on the needs and setup of the function being implemented.

There are three basic DMA modes of operation (listed in order of priority and complexity of implementation): DMA initiated by an advance microcontroller bus such as an advance extensible interface (AXI) bus to a quad, and quad to the interface bus; processor initiated, interface bus to a quad, and quad to the interface bus; and processor initiated quad to quad. For interface bus-initiated DMA transfers, some processing elements can be operated as slaves, responding to a DMA protocol implemented on top of the data transfers across switching elements. These transfers can occur without any involvement of the processing elements. DMA transfers occur over a DMA path that is established by the router between the microcontroller interface (AXI), and the set of clusters that are involved in the transfer. This path is a sequence of scheduled switch instructions that provide a path for data to move between the addressed cluster (e.g. 230) and the AXI interface.

The flow control for both read and write transfers to a cluster is managed by the AXI interface. There is no mechanism for asserting back pressure to the fabric, so the AXI interface must supply a data token that flows through the fabric for all pieces of read and write data. If the AXI wants to fetch another word, it sends an empty DMA data token down the DMA path through the fabric. Note that an empty DMA data token has the various status bits all set to '0'—to indicate empty data. The cluster that is responding to the DMA will fill the token with the next piece of data and it will flow back out to the AXI interface. For write-only transfers, the path goes from the AXI interface to the destination clusters and there is no return path. For read-only and read/write transfers, the path goes from the AXI interface to the addressed clusters, and back again to the AXI interface. The AXI interface can use this type of path for both read and write transfers. The AXI4 protocol does not support read+write transfers, so these are not supported. However, other embodiments may allow support of read+write transfers. To increase the data bandwidth, the router should establish more paths in parallel through the fabric down which data can be streamed. The router should make sure that the paths provide the data tokens at the destination clusters in the same order as they are sourced from the AXI bus.

Processing elements can initiate DMA transfers to and from the microcontroller bus. Each block can contain two AXI master interfaces, also known as an AMI or an AXIM. Each is interface is connected to 4 FIFO-to-fabric blocks and can support 64 independently managed FIFO channels. A cluster can initiate an AXI transfer by sending a request to one of the AMI blocks via an uplink data channel. The uplink channel can include multiple processing elements and/or switching elements. The AMI block will send a response back to the processing element cluster via the matching downlink channel. Both channels should be configured as streaming data, and the flow control in the uplink channel should be managed using the credit counter in the requesting cluster. The request includes a system address and an address for the transfer. For a read operation, the data is transferred from the system address and a DMA transfer is established that writes the data to the address (in the destination cluster). For a write operation, a DMA transfer is setup to read the data from the address in the source cluster and send it out to the system address.

Processing elements can initiate cluster to cluster transfers. This class of DMA transfer requires a cluster to become a master in a transfer that is entirely within the switching element/processing element fabric. It can therefore happen at very high transfer rate, depending on the available DMA paths established between the clusters. A processing element 280 can initiate a DMA transfer between itself and another cluster 284 in the array, or between other clusters, for example between cluster 282 and cluster 290 or between clusters 291 and 297. A DMA path is established by software between all of the clusters participating in the transfer. The path starts and finishes with the cluster that will be the master for the transfers, except in the case of posted writes. The master transmits DMA header tokens down the path such as 282 to 290 to 291 to 292 to 293 to 294 to 295 to 296 to 297, which are the elements that will participate in the transfer. The DMA transfer path can be illustrated as a bucket brigade, passing DMA data from element to element until the final destination is reached. This is achieved by setting the parameters in the control registers, and executing the DMA read/write instructions on the master. These headers address the possible readers and writers in the path (including the master cluster itself) and setup the parameters for the transfer. A reader is a cluster that reads data from its quad data RAM and feeds it into the data path. A DMA transfer can have a single reader, and multiple writers, and typically, all will execute the transfer in a DMA slave state. There are cases where the master is reading from its own memory, in which case, the DMA read is executing in the DMA master state. DMA fan-out enables data to be transferred from one cluster to many others in a single DMA operation. When the headers are all sent out, the processing executes a DMA start instruction that initiates a state machine that identifies the opportunities for it to master data transfers. Data tokens are sent into the DMA path using a switch instruction. The tokens must flow through the readers before flowing to the writers. As the tokens pass through the readers, the addressed cluster will fill the token with data. Each of the writers will copy the data token and write the data into its Quad RAM. In the illustration 202, there is no path set up to return status or successful completion to processing element 280. In this case, only a posted write operation is possible, because there is handshake with the initiating cluster. Note that in illustration 200, there is always a possible path back to processing element 212 in master cluster 210, however circuitous the path may be.

Figure 3:
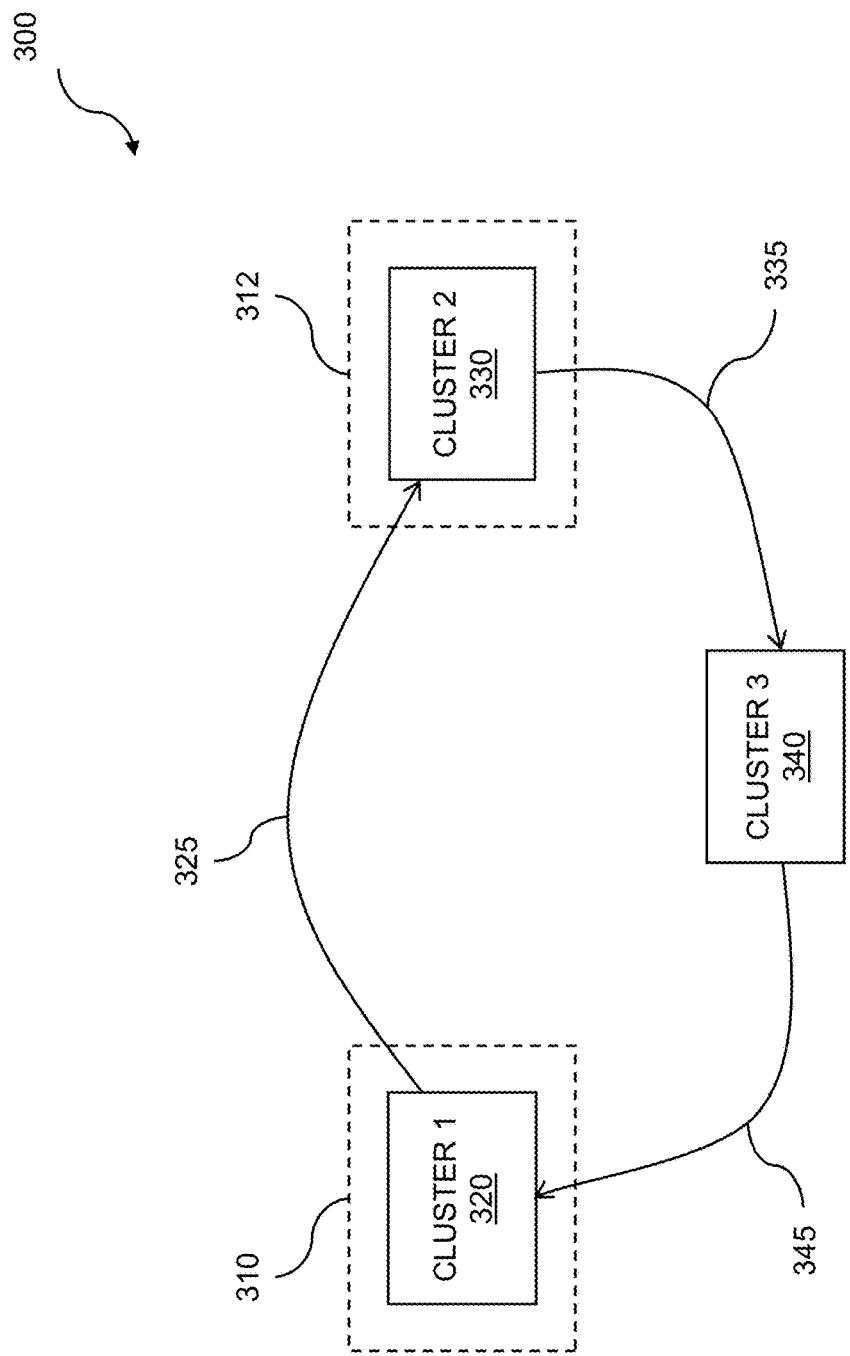
FIG. 3 shows master read/write paths to clusters.

FIG. 3 shows master read/write paths to clusters. Data can be obtained from a first switching element, where the first switching element can be controlled by a first circular buffer. Data can be sent to a second switching element, where the second switching element can be controlled by a second circular buffer. The obtaining data from the first switching element and the sending data to the second switching element can include a direct memory access (DMA). Processing elements designated as masters can establish and use read/write paths to clusters 300. A master cluster 3 340 can initiate a DMA transfer from cluster 1 320 to cluster 2 330 along path 325. The Cluster 1 320 can comprise a reader cluster 310, and cluster 2 330 can comprise a writer cluster 312. Cluster 1 320 and cluster 2 330 are slaves of master cluster 340. The slave clusters can include readers and writers, such as slave reader clusters 310 and slave writer clusters 312. Master cluster 3 340 can initiate the DMA operation by setting up the transfer from cluster 1 320 to cluster 2 330 along path 345. Various nearby processing elements can form the communication path (or communications paths if needed) between the master processing element and the slave processing elements. Such processing elements can be included along path 345, path 325, and path 335. Such processing elements can be included within reader cluster 310 and writer cluster 312 to facilitate DMA transfer from specific cluster 320 to specific cluster 330. When slave cluster 2 330 has successfully written the data that was read from slave cluster 1 320 along path 325, it can signal master cluster 3 340 of a successful completion to the operation (or not, as the case may be). A read path can be used for both read and write DMA operations between a master processing element and one or more slave processing elements. Whether a particular transfer is a read operation or a write operation can be determined by a bit of an address transaction in the DMA protocol. For example, if the bit is set to "1", a DMA READ operation may occur, while if the bit is reset to "0", then a DMA WRITE operation may occur.

The DMA master can provide a token to the reader cluster in which the data resides. The DMA master can control the flow between clusters, including the flow rate. Too much data being scheduled over the same DMA paths can result in conflicts and bottlenecks, so the master controls the flow rate. The DMA master can provide an address to designate the proper writer cluster among a plurality of clusters. The master can also provide synchronization among the clusters, as well as control of the clusters using tokens and a DMA protocol. In embodiments, the plurality of switching elements forms two or more clusters within a reconfigurable fabric. In embodiments, a cluster within two or more clusters is synchronized to a tic cycle boundary. In embodiments, the cluster within the two or more clusters and a second cluster within the two or more clusters operate on different tic cycles. In embodiments, the cluster within the two or more clusters and a second cluster within the two or more clusters operate on different tic clocks. In embodiments, the two or more clusters comprise a dataflow processor.

After a DMA master initiates a transfer, it is possible for a reader or writer cluster to abandon the transaction. There are various reasons to abandon a transaction including an unresolvable conflict, a hardware error, an unavailable address, and so on. A token scheme can be used to initiate, as well as abandon, the transaction. The token issued by the master can have a header indicating which cluster among the reconfigurable fabric clusters is the intended reader cluster and which is the intended writer cluster. One or more of the clusters involved in the transfer can indicate that the transfer needs to be abandoned, which will be signified by updating the token header as it continues along the transfer path back to the master. The abandoned transfer can be retried. Multiple masters can use separate paths among the clusters of the reconfigurable fabric by separating usage of the paths in time. Instructions are loaded into the switch elements to facilitate the proper path selection.

Figure 4A:
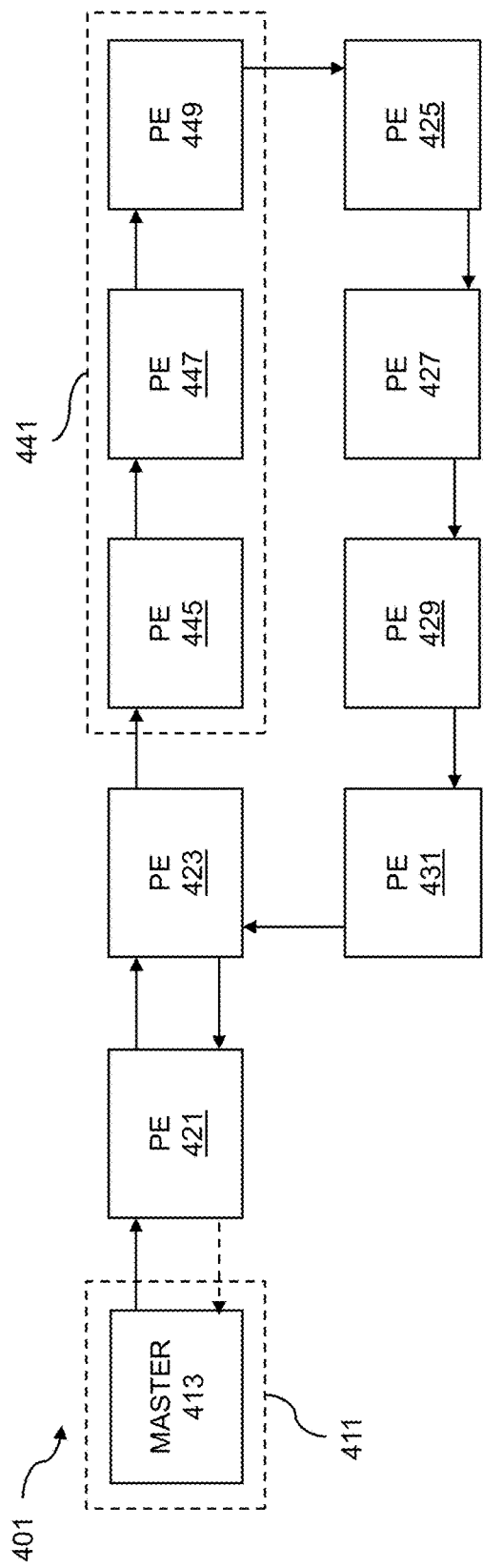
FIG. 4A illustrates master-initiated read/write from another cluster.
Figure 4B:
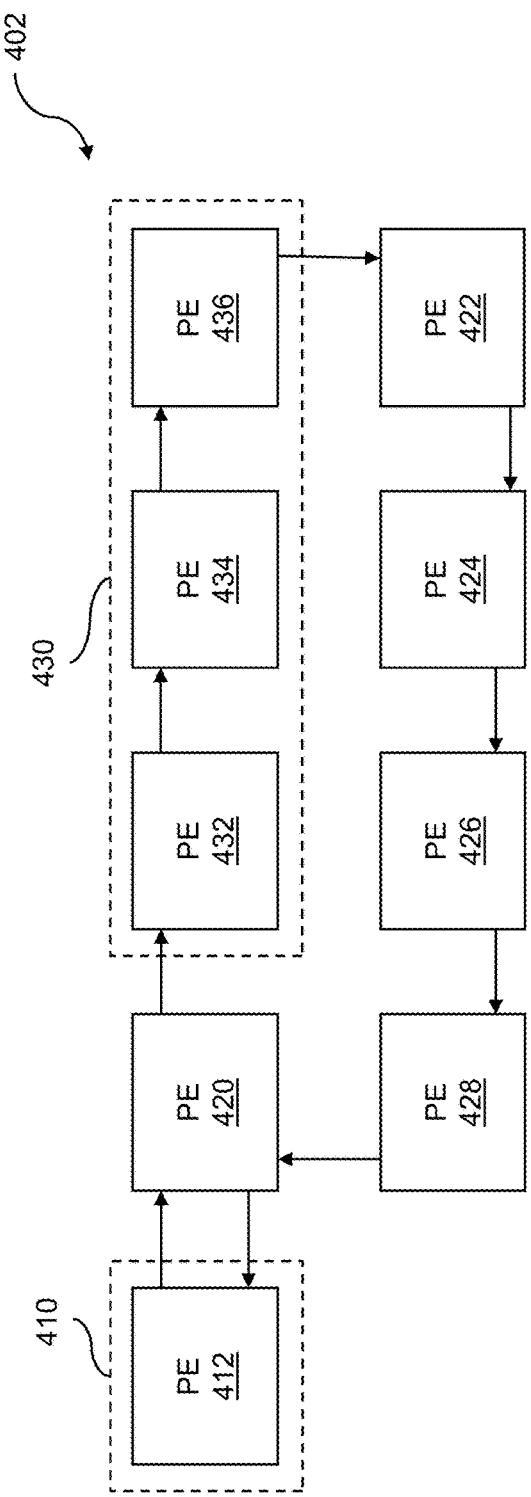
FIG. 4B illustrates processor element-initiated read/write from another cluster.

FIG. 4A and FIG. 4B illustrate read/write operations initiated from another cluster. Data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can comprise a direct memory access (DMA). The processor element-initiated read/write 402 from another cluster can include a direct memory access (DMA) path for a transfer between two clusters. A master 410 can include a processing element 412. The processing element 412 can communicate through other processing elements, here 420, with slave processing elements 430, where the slaves can be readers or writers. Three slave processing elements, 432, 434, and 436 are shown. A return communication path to the master processing element 412 can include any number of processing elements such as 422, 424, 426, 428, and 420 shown.

In this case, one of the clusters behaves as the master for the transaction, and the other cluster becomes the slave. It is also possible for one cluster to be both Master and Slave. The processing elements in the master cluster program the transfer (including the addresses for both clusters) and execute the sequence of instructions to program both microDMA controllers for the transfer. It is possible to program multiple DMA paths to increase the bandwidth for the transfer. Each path consists of a DMA instruction in the L2 switch of the master and traverses the set of slave clusters that can be addressed by the transfer and then may/can return to the master cluster.

The master-initiated read/write 401 from another cluster can include a direct memory access (DMA) path for a transfer between two clusters. A master 411 can include a processing element 413. The processing element 413 can communicate through other processing elements, here 421 and 423, with slave processing elements 441, where the slaves can be readers. Three slave processing elements, 445, 447, and 449 are shown. A return communication path to the master processing element 413 can include any number of processing elements such as 425, 427, 429, 431, and 421. The data can be transferred from slave cluster 441 back to master cluster 411 through the return communication path. The master cluster does not have to be the repository of the DMA data, but may act only as a controller of the operation. In other embodiments, the master cluster both initiates the DMA access and is the cluster that will consume the data upon transfer completion.

The microDMA controllers are required to commence the process in the DMA idle state (i.e. that they should not already be involved in a DMA transfer—including the case where the addressed source and destination addresses are in the same cluster). The software must guarantee that the DMAs are not already involved in a transfer. The cluster behaving as a master can be informed of the successful completion of the transfer using the return communication path technique described above. When reading the master cluster, the data is read from the quad data RAMs and supplied into the DMA path. The exception to this is the case where the master cluster is also the destination. In that case, there is no need to send the data to the output path because it is contained within the master cluster. Once the data has been sent into the DMA path, it is expected that the cluster programmed as the destination slave will sink the data as required.

The slave state machine in the cluster that is serving as the master for the transfer is programmed to be the master. Then, an instruction is used to program the remote slave state machine. When executing the transfer, that is, reading the slave cluster and writing the master, the switch in the master executes two instructions for each beat of the transfer. The head instruction for the path is the switch instruction, and the end of the DMA path is a regular switch instruction in the master that consumes the incoming data from the other cluster and writes it into the quad data RAM in the master cluster. In the case where the Slave state machine in the master is programmed with an instruction, the first source data is pre-fetched 2 cycles after the DMA instruction is executed in the L2 switch in the master cluster to program the slave state machine.

In the case where the source and destination addresses are within the master cluster, the DMA write header is bounced of a neighboring cluster (or flows through a DMA path that originates from the master cluster and includes the master cluster to program its SLAVE controller) so that the SLAVE controller in the master cluster will respond appropriately. There is no requirement for the slave controller to "snoop" the transaction before it is sent out.

The master still executes DMA write and DMA read instructions in that order. The DMA write header will program the SLAVE controller, then the DMA read header will program the Master. Two cycles following the L2 switch instruction, the quad data RAM is pre-fetched according to the source destination address in the MASTER state machine. Once the DMA start instruction is executed by a processing element in the Master, the microDMA controller will transfer data from source to destination with each L2 switch DMA instruction. The pre-fetch of the next data is always initiated two cycles following the L2 switch DMA instruction.

Figure 5:
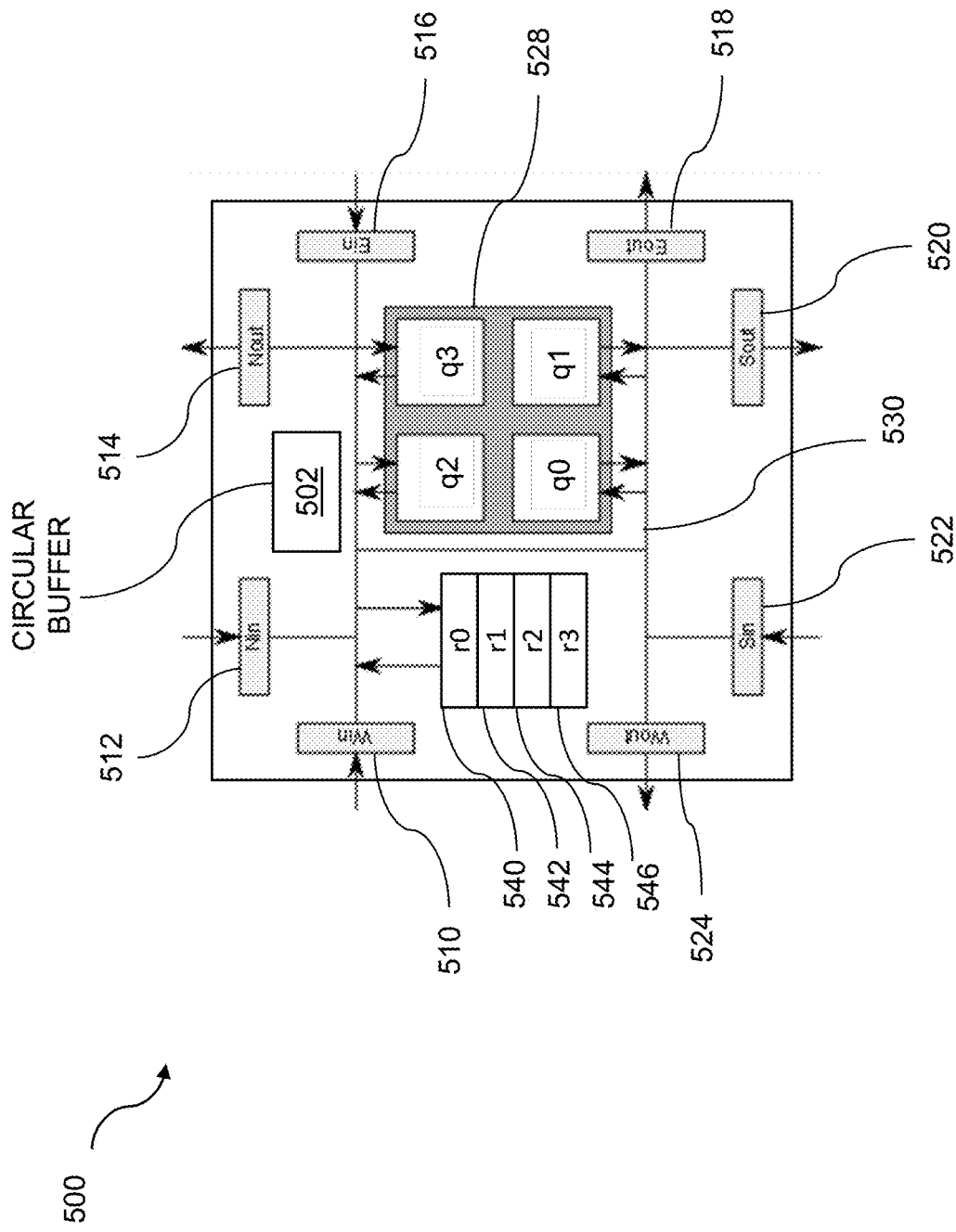
FIG. 5 is an example cluster for course-grained reconfigurable processing.

FIG. 5 is an example cluster 500 for course-grained reconfigurable processing. Data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The cluster 500 comprises a circular buffer 502. The circular buffer 502 can be referred to as a main circular buffer or a switch-instruction circular buffer. In some embodiments, the cluster 500 comprises additional circular buffers corresponding to processing elements within the cluster. The additional circular buffers can be referred to as processor instruction circular buffers. The example cluster 500 comprises a plurality of logical elements, configurable connections between the logical elements, and a circular buffer 502 controlling the configurable connections. The logical elements can further comprise one or more of switching elements, processing elements, or storage elements. The example cluster 500 also comprises four processing elements (q0, q1, q2, and q3). The four processing elements can collectively be referred to as a "quad," and jointly indicated by a grey reference box 528. In embodiments, there is intercommunication among and between each of the four processing elements. In embodiments, the circular buffer 502 controls the passing of data to the quad of processing elements 528 through switching elements. In embodiments, the four processing elements 528 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message passing via a bus or shared memory interface. Power gating can be applied to one or more processors (e.g. q1) in order to reduce power.

The cluster 500 can further comprise storage elements coupled to the configurable connections. As shown, the cluster 500 comprises four storage elements (r0 540, r1 542, r2 544, and r3 546). The cluster 500 further comprises a north input (Nin) 512, a north output (Nout) 514, an east input (Ein) 516, an east output (Eout) 518, a south input (Sin) 522, a south output (Sout) 520, a west input (Win) 510, and a west output (Wout) 524. The circular buffer 502 can contain switch instructions that implement configurable connections. For example, an instruction effectively connects the west input 510 with the north output 514 and the east output 518 and this routing is accomplished via bus 530. The cluster 500 can further comprise a plurality of circular buffers residing on a semiconductor chip, where the plurality of circular buffers controls unique, configurable connections between the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

As stated previously, the preprocessor can be configured to prevent data collisions within the circular buffer 502. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 524 to an instruction placing data on the south output 520, such that the data can be output on both output ports within the same pipeline cycle. In a case where data needs to travel to a cluster that is both south and west of the cluster 500, it can be more efficient to send the data directly to the south output port rather than storing the data in a register and sending the data to the west output on a subsequent pipeline cycle.

Considering how an L2 switch works starts with the instruction set. A switch instruction typically has a source and a destination. Data is accepted from the source and sent to the destination. There are several sources (e.g. any of the quads within a cluster, any of the L2 directions (North, East, South, West), a switch register, one of the quad RAMs (data RAM, IRAM, PE/Co Processor Register). To accept data from any L2 direction (for example) a "valid" bit is used to inform the switch that the data flowing through the fabric is indeed valid. The switch will select the valid data from the set of specified inputs. For this to function properly, only one input can have valid data, and the other inputs must all be marked as invalid. It should be noted that this fan-in operation at the switch inputs operates independently for control and data. There is no requirement for a fan-in mux to select data and control bits from the same input source. Data valid bits are used to select valid data, and control valid bits are used to select the valid control input. There are many sources and destinations for the switching element, which can result in too many instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can implement any safe function of the two inputs. For example, the fan-in could implement a logical OR of the input data. Any output data is acceptable because the input condition is an error as long as no damage is done to the silicon. In the event that a mem bit is set to '1' for both inputs, an output mem bit should also be set to '1'. A switch instruction can accept data from any quad or from any neighbor L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical, or a combination (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A", to initiate a transfer of data between cluster "B" and cluster "C" without any involvement of the processing elements in clusters "B" and "C". Furthermore, cluster "A" can initiate a fan-out transfer of data from cluster "B" to clusters "C", "D", and so on, where each destination cluster writes a copy of the DMA data to different locations within their quad RAMs. A DMA mechanism may also be used for programming instructions into the instruction RAMs.

Accesses to RAM in different clusters can travel through the same DMA path, but the transactions must be separately defined. A maximum block size for a single DMA transfer can be 8 KB. Accesses to data RAMs can be performed when the processors are running. Accesses to data RAMs can also be performed while the processors are in a low power "sleep" state. Accesses to the instruction RAMs and the PE and Co-Processor Registers may be performed during configuration mode. The quad RAMs may have a single read/write port with a single address decoder, thus allowing access to them to be shared by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

Figure 6:
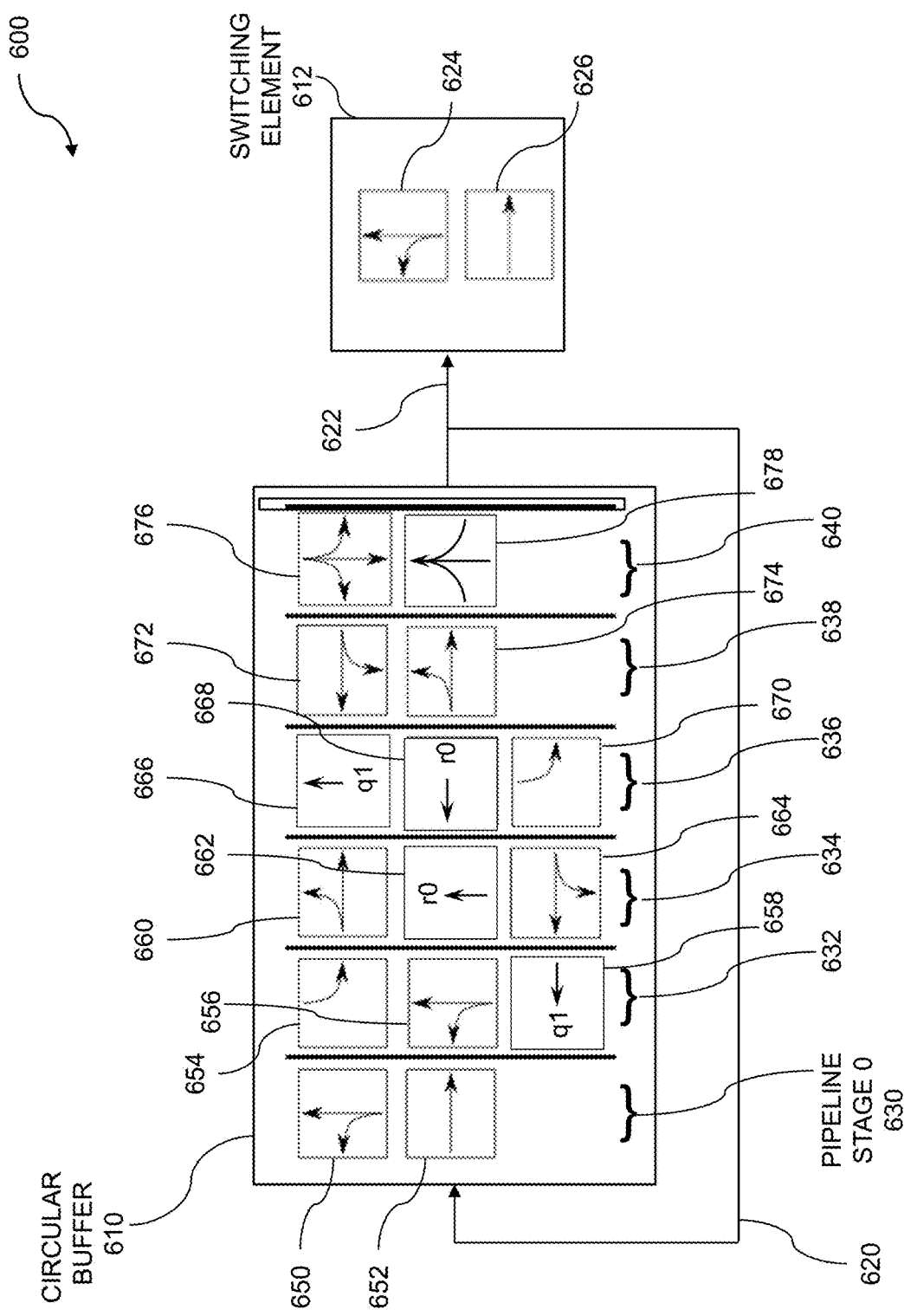
FIG. 6 illustrates a block diagram of a circular buffer.

FIG. 6 illustrates a block diagram of a circular buffer. A circular buffer can be used for controlling reconfigurable fabric operation linkage. A first function to be performed on a first cluster within a reconfigurable fabric is determined. A distance is calculated from the first cluster to a second cluster that receives output from the first function on the first cluster. A time duration is calculated for the output from the first function to travel to the second cluster through the reconfigurable fabric. A first set of instructions for the first function is allocated to the first cluster based on the distance and the time duration. The allocating the first set of instructions is accomplished using a satisfiability solver technique, which constructs a set of mapping constraints and builds a satisfiability model of the mapping constraints.

The FIG. 600 illustrates a block diagram of a circular buffer 610 and a corresponding switching element 612. The circular buffer and the corresponding switching element can be used in part for remote usage of machine learned layers by a second machine learning construct. A first data group is collected in a first locality and is applied to a first localized machine learning construct. A first set of convolutional layers is determined within the first localized machine learning construct based on the first data group where the first set of convolutional layers includes a first data flow graph machine. The first set of convolutional layers is sent to a second localized machine learning construct. A second data group is analyzed by the second machine learning construct using the first set of convolutional layers.

Returning to the FIG. 600, for the circular buffer 610 and the corresponding switching element 612, data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The block diagram 600 describes a processor-implemented method for data manipulation. The circular buffer 610 contains a plurality of pipeline stages. Each pipeline stage contains one or more instructions, up to a maximum instruction depth. In the embodiment shown in FIG. 6, the circular buffer 610 is a 6×3 circular buffer, meaning that it implements a six-stage pipeline with an instruction depth of up to three instructions per stage (column). Hence, the circular buffer 610 can include one, two, or three switch instruction entries per column. In some embodiments, the plurality of switch instructions per cycle can comprise two or three switch instructions per cycle. However, in certain embodiments, the circular buffer 610 supports only a single switch instruction in a given cycle. In the example 600 shown, Pipeline Stage 0 630 has an instruction depth of two instructions 650 and 652. Though the remaining pipeline stages 1-5 are not textually labeled in the FIG. 600, the stages are indicated by callouts 632, 634, 636, 638, and 640. Pipeline stage 1 632 has an instruction depth of three instructions 654, 656, and 658. Pipeline stage 2 634 has an instruction depth of three instructions 660, 662, and 664. Pipeline stage 3 636 also has an instruction depth of three instructions 666, 668, and 670. Pipeline stage 4 638 has an instruction depth of two instructions 672 and 674. Pipeline stage 5 640 has an instruction depth of two instructions 676 and 678. In embodiments, the circular buffer 610 includes 64 columns. During operation, the circular buffer 610 rotates through configuration instructions. The circular buffer 610 can dynamically change operation of the logical elements based on the rotation of the circular buffer. The circular buffer 610 can comprise a plurality of switch instructions per cycle for the configurable connections.

The instruction 652 is an example of a switch instruction. In embodiments, each cluster has four inputs and four outputs, each designated within the cluster's nomenclature as "north," "east," "south," and "west" respectively. For example, the instruction 652 in the diagram 600 is a west-to-east transfer instruction. The instruction 652 directs the cluster to take data on its west input and send out the data on its east output. In another example of data routing, the instruction 650 is a fan-out instruction. The instruction 650 instructs the cluster to take data from its south input and send out on the data through both its north output and its west output. The arrows within each instruction box indicate the source and destination of the data. The instruction 678 is an example of a fan-in instruction. The instruction 678 takes data from the west, south, and east inputs and sends out the data on the north output. Therefore, the configurable connections can be considered to be time multiplexed.

In embodiments, the clusters implement multiple storage elements in the form of registers. In the example 600 shown, the instruction 662 is a local storage instruction. The instruction 662 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

The obtaining data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of sleep state when the transfer is completed. This waking is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of sleep by the arrival of valid data (or control) following the execution of a switch instruction. A processing element or switching element can determine why it was brought out of a sleep state by the context of the code that the element starts to execute. A cluster can be awoken during a DMA operation by the arrival of valid data. The DMA instruction can be executed while the cluster remains asleep as the cluster awaits the arrival of valid data. Upon arrival of the valid data, the cluster is woken and the data stored. Accesses to one or more data random access memories (RAM) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 658 is a processing instruction. The instruction 658 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 600 shown, the circular buffer 610 rotates instructions in each pipeline stage into switching element 612 via a forward data path 622, and also back to a pipeline stage 0 630 via a feedback data path 620. Instructions can include switching instructions, storage instructions, and processing instructions, among others. The feedback data path 620 can allow instructions within the switching element 612 to be transferred back to the circular buffer. Hence, the instructions 624 and 626 in the switching element 612 can also be transferred back to pipeline stage 0 as the instructions 650 and 652. In addition to the instructions depicted on FIG. 6, a no-op instruction can also be inserted into a pipeline stage. In embodiments, a no-op instruction causes execution to not be performed for a given cycle. In effect, the introduction of a no-op instruction can cause a column within the circular buffer 610 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using null convention logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by stimulus external to the logical element and not based on the programming of the logical element. The external stimulus can include an input signal, which in turn can cause a wake up or an interrupt service request to execute on one or more of the logical elements. An example of such a wake-up request can be seen in the instruction 658, assuming that the processor q1 was previously in a sleep state. In embodiments, when the instruction 658 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 666. In the case of the instruction 666, data from the processor q1 is moved to the north output. In some embodiments, if Xs have been placed into the processor q1, such as during the instruction 658, then Xs would be retrieved from the processor q1 during the execution of the instruction 666 and applied to the north output of the instruction 666.

A collision occurs if multiple instructions route data to a particular port in a given pipeline stage. For example, if instructions 652 and 654 are in the same pipeline stage, they will both send data to the east output at the same time, thus causing a collision since neither instruction is part of a time-multiplexed fan-in instruction (such as the instruction 678). To avoid potential collisions, certain embodiments use preprocessing, such as by a compiler, to arrange the instructions in such a way that there are no collisions when the instructions are loaded into the circular buffer. Thus, the circular buffer 610 can be statically scheduled in order to prevent data collisions. Thus, in embodiments, the circular buffers are statically scheduled. In embodiments, when the preprocessor detects a data collision, the scheduler changes the order of the instructions to prevent the collision. Alternatively, or additionally, the preprocessor can insert further instructions such as storage instructions (e.g. the instruction 662), sleep instructions, or no-op instructions, to prevent the collision. Alternatively, or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the Read transfer is mastered by the DMA controller in the interface. It includes a credit count that keeps track of the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will make sure the memory bit is reset to 0, thereby preventing a microDMA controller in the source cluster from sending more data.

Each slave interface manages four interfaces between the FIFOs and the fabric. Each interface can contain up to 15 data channels. Therefore, a slave should manage read/write queues for up to 60 channels. Each channel can be programmed to be a DMA channel, or a streaming data channel. DMA channels are managed using a DMA protocol. Streaming data channels are expected to maintain their own form of flow control using the status of the Rx FIFOs (obtained using a query mechanism). Read requests to slave interfaces use one of the flow control mechanisms described previously.

Figure 7:
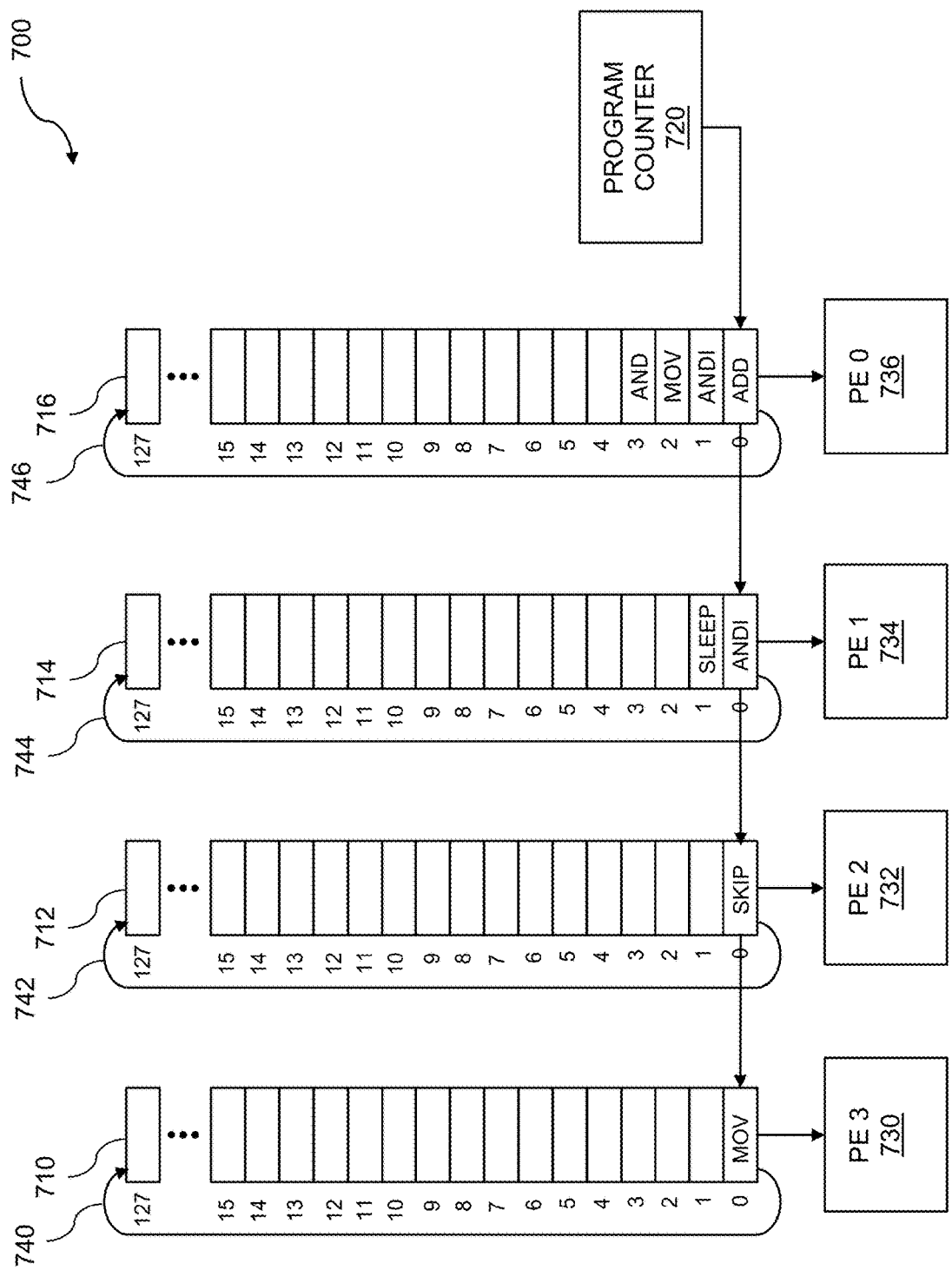
FIG. 7 illustrates a circular buffer and processing elements.

FIG. 7 illustrates a circular buffer and processing elements. This figure shows a diagram 700 indicating example instruction execution for processing elements. The instruction execution can include reconfigurable fabric DMA operation. A first function to be performed on a reconfigurable fabric is determined. The first function is performed on a first cluster within the reconfigurable fabric. A distance is calculated from the first cluster to a second cluster that receives output from the first function on the first cluster. A time duration is calculated for the output from the first function to travel to the second cluster through the reconfigurable fabric. A first set of instructions is allocated for the first function to the first cluster based on the distance and the time duration. The allocating the first set of instructions is accomplished using a satisfiability solver technique such as a Boolean satisfiability solver. A set of mapping constraints is constructed and a satisfiability model is built. The model is solved and a solution is stored.

A circular buffer 710 feeds a processing element (PE) 730. A second circular buffer 712 feeds another processing element 732. A third circular buffer 714 feeds another processing element 734. A fourth circular buffer 716 feeds another processing element 736. The four processing elements 730, 732, 734, and 736 can represent a quad of processing elements. In embodiments, the processing elements 730, 732, 734, and 736 are controlled by instructions received from the circular buffers 710, 712, 714, and 716. The circular buffers can be implemented using feedback paths 740, 742, 744, and 746, respectively. In embodiments, the circular buffer can control the passing of data to a quad of processing elements through switching elements, where each of the quad of processing elements is controlled by four other circular buffers (as shown in the circular buffers 710, 712, 714, and 716) and where data is passed back through the switching elements from the quad of processing elements where the switching elements are again controlled by the main circular buffer. In embodiments, a program counter 720 is configured to point to the current instruction within a circular buffer. In embodiments with a configured program counter, the contents of the circular buffer are not shifted or copied to new locations on each instruction cycle. Rather, the program counter 720 is incremented in each cycle to point to a new location in the circular buffer. The circular buffers 710, 712, 714, and 716 can contain instructions for the processing elements. The instructions can include, but are not limited to, move instructions, skip instructions, logical AND instructions, logical AND-Invert (e.g. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction, causing the instruction in the circular buffer to be ignored and ultimately the corresponding operation is not performed.

The plurality of circular buffers can have differing lengths. That is, the plurality of circular buffers can comprise circular buffers of differing sizes. In embodiments, the circular buffers 710 and 712 have a length of 128 instructions, the circular buffer 714 has a length of 64 instructions, and the circular buffer 716 has a length of 32 instructions, but other circular buffer lengths are also possible, and in some embodiments, all buffers have the same length. The plurality of circular buffers that have differing lengths can resynchronize with a zeroth pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 7, different circular buffers can have different instruction sets within them. For example, circular buffer 710 contains a MOV instruction. Circular buffer 712 contains a SKIP instruction. Circular buffer 714 contains a SLEEP instruction and an ANDI instruction. Circular buffer 716 contains an AND instruction, a MOVE instruction, an ANDI instruction, and an ADD instruction. The operations performed by the processing elements 730, 732, 734, and 736 are dynamic and can change over time, based on the instructions loaded into the respective circular buffers. As the circular buffers rotate, new instructions can be executed by the respective processing element.

Figure 8:
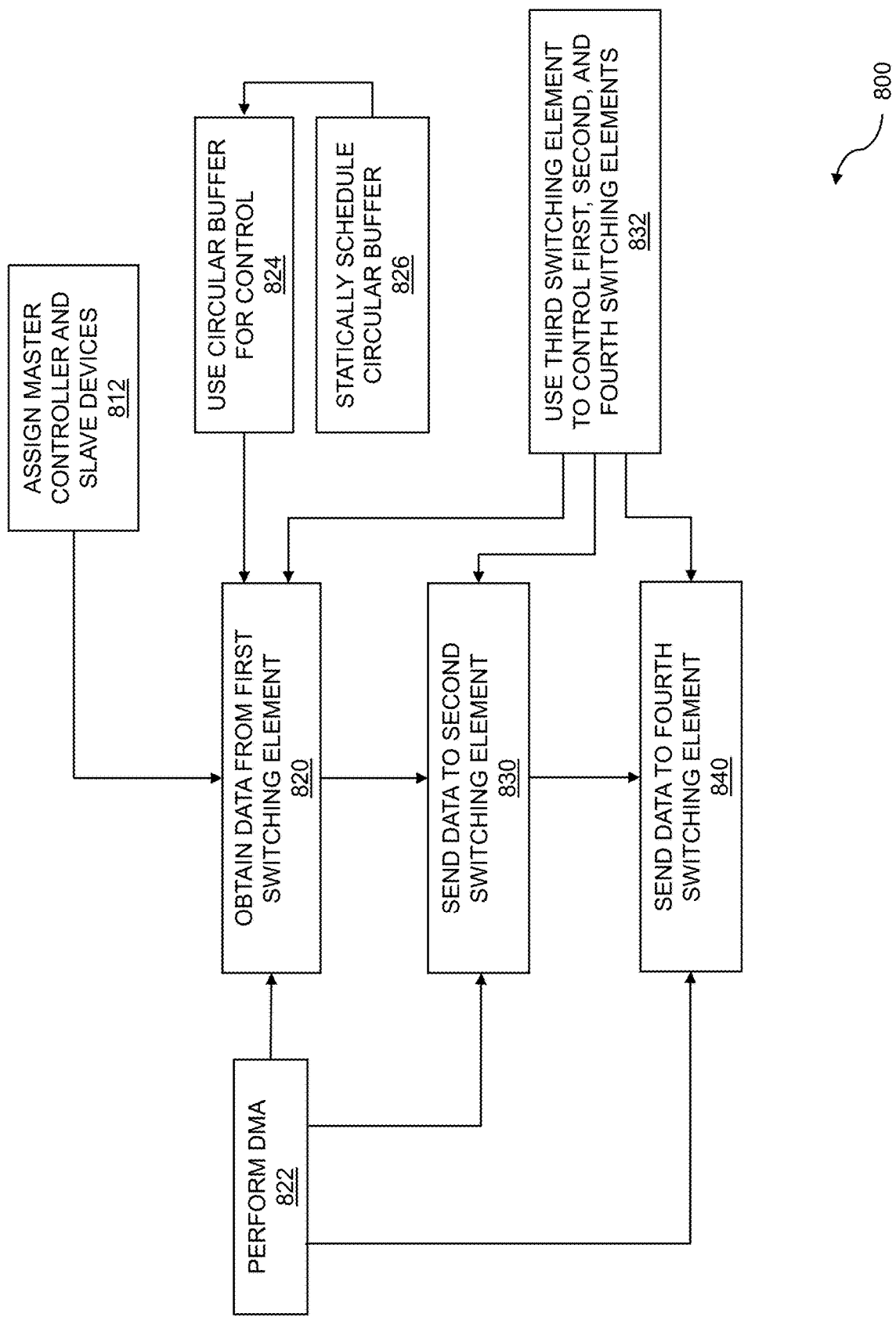
FIG. 8 is a flow diagram for additional data manipulation.

FIG. 8 is a flow diagram for data manipulation using a fourth switching element within a plurality of switching elements. A flow 800 may continue from or be part of the previous flow 100. The fourth switching element can be controlled by a fourth circular buffer. The flow 800 includes obtaining data from a first switching element 820. The flow 800 includes sending data to a second switching element 830. The flow 800 includes assigning a master controller and slave devices 812. Any processing element or switching element can be assigned as a master controller. In embodiments, one of a first switching element or a second switching element can operate as a master controller. More than one master controller can be assigned. Other switching elements such as a third switching element can be assigned as the master controller. As is the case for assigning a master controller, one or more slave devices can be assigned. In embodiments, multiple switching elements can operate as slave units. That is, both the first switching element and/or the second switching element can operate as slave devices. The flow 800 includes obtaining data from a first switching element 820 within a plurality of switching elements. The switching element from which data is obtained can be a master controller, a slave device operating as a writer, and so on. The plurality of switching elements can include a reconfigurable fabric. Any switching element within the plurality of switching elements can provide the data that is obtained. The flow 800 includes using a circular buffer for control 824, where the first switching element is controlled by a first circular buffer. The circular buffer can contain instructions, data, status bits, control bits etc. The first circular buffer and other circular buffers that can be used for control can be statically scheduled 826. The data that can be obtained from the first switching element can include a block of memory obtained from storage in the first switching element. The block of data can include bits, nibbles, bytes, words, etc. where the words can be of any size appropriate to the switching elements of the fabric. The block of memory can include a beginning address in the storage, where the storage is coupled to the first switching element. In order to indicate the end of the block of storage to be used for obtaining data from the first switching element, the block of memory can include an ending address in the storage. To support the obtaining data from the first switching element, the beginning address and the ending address of the block of memory can be stored with instructions in the first circular buffer. A first data obtained from the first switching element can include instructions. The instructions can be written into one or more circular buffers contained within the plurality of switching elements. The flow 800 includes performing a direct memory access (DMA) 822. The direct memory access can include accessing memory that can be associated with the first switching element, with a second switching element, with a third switching element, with a fourth switching element, and so on. The DMA can support obtaining the block of data.

The flow 800 can include using the third switching element to control the first, second, and fourth switching elements 832 from the plurality of switching elements. When the first switching element and the second switching are not immediate neighbors such as neighbors located adjacently to the north, south, east, west, etc., then data obtained from the first switching element can be routed through one or more additional switching elements. Any numbers of other switching elements in the cluster can be used for routing data. The flow 800 includes sending data to the fourth switching element 840. The third switching element can operate as a master controller, and the first switching element, the second switching element, and the fourth switching element can operate as slave devices. For example, the third switching element can control the first switching element that can be a writer slave device and control the second and third switching elements that can be reader slave devices. The third switching element can control the fourth switching element hierarchically. Thus, the flow 800 can use the third switching element to control the first, second, and fourth switching elements 832. For example, the third switching element can control the first switching element, which in turn passes instructions and control to the second switching element, and so on. The switching elements can be memory elements. The memory elements can be instruction random access memory (I-RAM), data random access memory (D-RAM), and so on. The I-RAM and the D-RAM can be quad I-RAM and quad D-RAM, respectively, where the I-RAM and/or the D-RAM supply instructions and/or data, respectively, to the processing quad of a switching element.

Various types of data can be obtained from the first switching element and sent to the second switching element. The data can include control and status bits, data bytes, data words, etc. The data can include valid data or invalid data. The obtaining of data and the sending of data can be contingent upon the presence of valid data, the absence of invalid data, etc. For example, the obtaining of data and the sending of data can be delayed, suspended, etc. while the data remains invalid, then can proceed when the data becomes valid. The data can include occupied data or empty data. That is, blocks of memory can be occupied with data or not. When empty data is "present" or indicated with a status indicator such as a status bit, then the obtaining of data and the sending of data can be suspended, delayed, sent into a sleep state, and so on. When data becomes occupied, then status can be woken from the sleep state and the obtaining data and sending data can proceed. Likewise, when data becomes valid, then status can be woken from the sleep state and the obtaining data and sending data can proceed. Various steps in the flow 800 may be changed in order, repeated, omitted, or the like without departing from the disclosed concepts. Various embodiments of the flow 800 can be included in a computer program product embodied in a non-transitory computer readable medium that includes code executable by one or more processors.

Figure 9A:
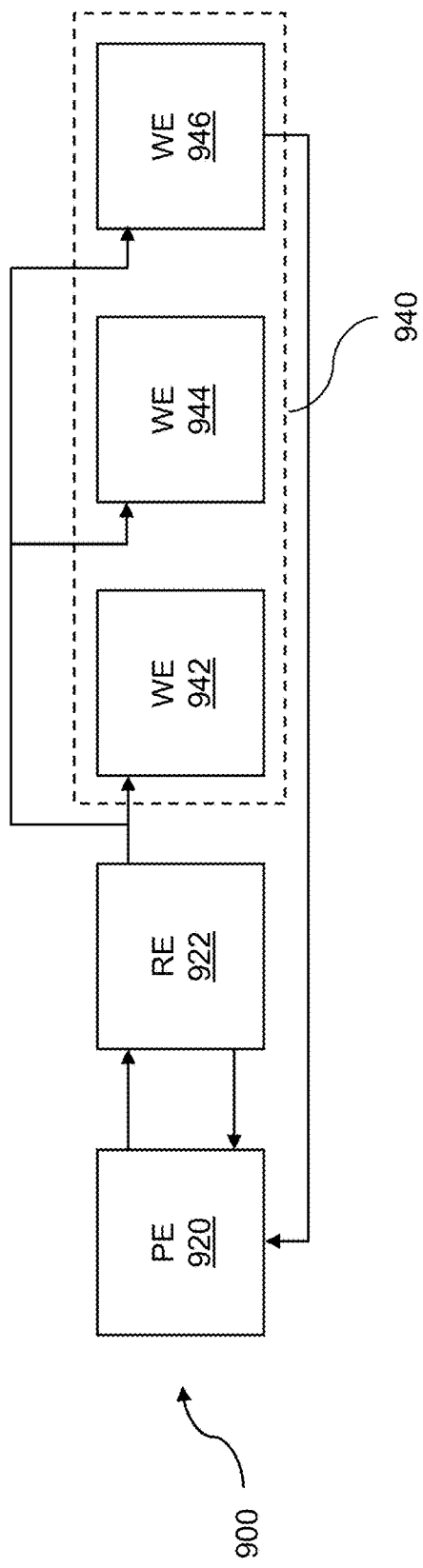
FIG. 9A illustrates a parallel configuration for multiple writes.

FIG. 9A illustrates a parallel configuration for multiple writes. Illustration 900 shows a switching element 920 configured as a master, processing element. The switching element 920 controls switching element 922 configured as a slave, read element. The switching element 920 controls switching elements 942, 944, and 946, which can be configured as slave, write elements. The control can be hierarchical. Write switching elements 942, 944, and 946 can be considered a group of switching elements 940. The group 940 can contain any number of switching elements. A first switching element 922 can read a first data and write the first data into a second switching element 942 and a fourth switching element 944. The first data from the first switching element 922 can be read based on the first data being valid. The first data can be written to the second switching element 942 based on the first data being valid. A third switching element 920 can hierarchically control transfers based on the first data being valid. The last element of group 940, namely, write switching element 946, can be similarly configured and can initiate communication back to the master, third switching element 920. The communication can be an acknowledgement that the write has completed.

Figure 9B:
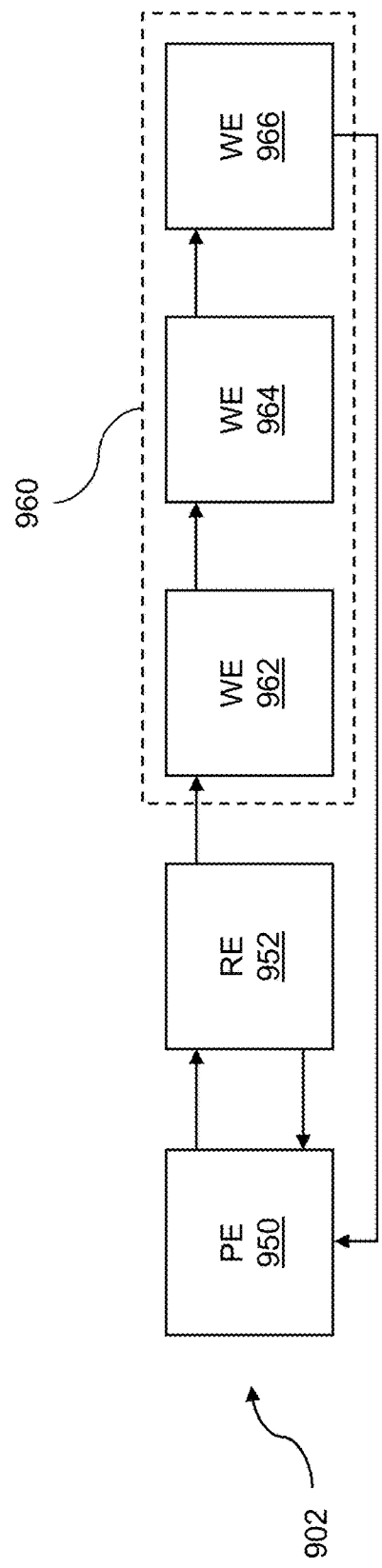
FIG. 9B illustrates a daisy-chain configuration for multiple writes.

FIG. 9B illustrates a daisy-chain configuration for multiple writes. Illustration 902 shows a switching element 950 configured as a master, processing element. The switching element 950 controls switching element 952 configured as a slave, read element. The switching element 950 controls switching elements 962, 964, and 966, which can be configured as slave, write elements. The control can be hierarchical. Write switching elements 962, 964, and 966 can be considered a group of switching elements 960. The group 960 can contain any number of switching elements. A first switching element 952 can read a first data and write the first data into a second switching element 962. The second switching element can write the first data into a fourth switching element 964. The fourth switching element 964 can write the first data into a fifth switching element 966. The first data from the first switching element 952 can be read based on the first data being valid. The first data can be written to the second switching element 962 based on the first data being valid. A third switching element 950 can hierarchically control transfers based on the first data being valid. The last element of group 960, namely, write switching element 966, can initiate communication back to the master, third switching element 920. The communication can be an acknowledgement that the write has completed. Thus, the first switching element can read a first data and write the first data into the second switching element, and the second switching element writes the first data into the fourth switching element. The fourth switching element can send an acknowledgement to the third switching element. The acknowledgement can be part of a non-posted write operation. A non-posted write operation is a write operation that will occur as soon as appropriate protocol completes and is not waiting for another operation to complete before it can complete. The hierarchical control can include writing data to the fifth element under immediate control of the fourth element, which is under immediate control of the second element, which is under immediate control of the first element, which is under ultimate control of the third element, which is a master element.

In embodiments, data is routed through a fifth switching element within the plurality of switching elements. The fifth switching element can be controlled by a fifth circular buffer. In embodiments, the fifth switching element is interposed between the first switching element and the second switching element. A sixth switching element can also be used for routing data. Any number of switching elements can be configured to route data within the plurality of switching elements. The switching elements can be dynamically configured to form a reconfigurable fabric.

Figure 10A:
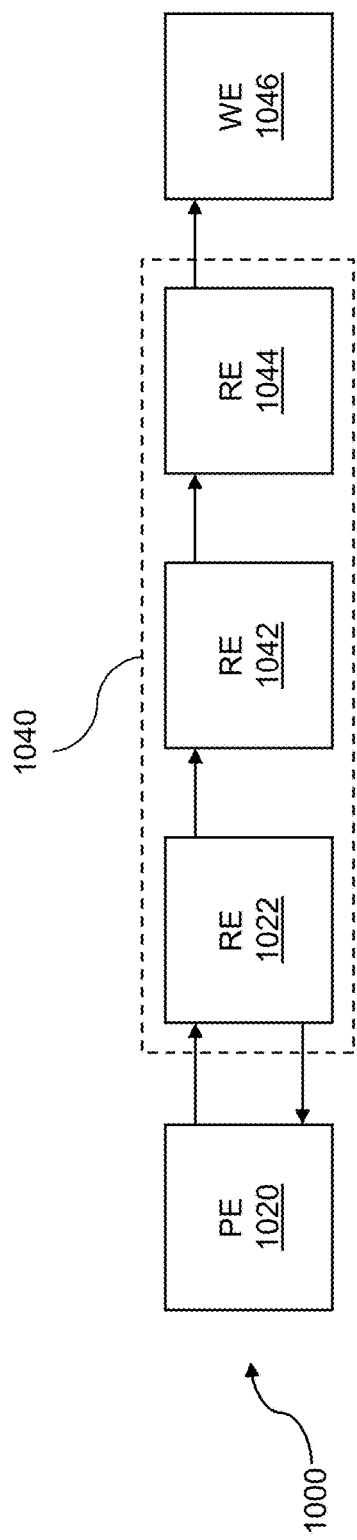
FIG. 10A illustrates a daisy-chain configuration for multiple reads.

FIG. 10A illustrates a daisy-chain configuration for multiple reads. In flow 1000, master switching element 1020 initiates a read operation to a first read switching element 1022, which in turn passes the read operation to a second read switching element 1042, which in turn passes the read operation to a third read switching element 1044. The three read elements 1022, 1042, and 1044 can be considered a group of switching elements 1040. Group 1040 can include any number of read switching elements. The last read element in group 1040, namely read element 1044, provides a first data to be written into write switching element 1046. The operation can be hierarchically controlled from master switching element 1020.

Figure 10B:
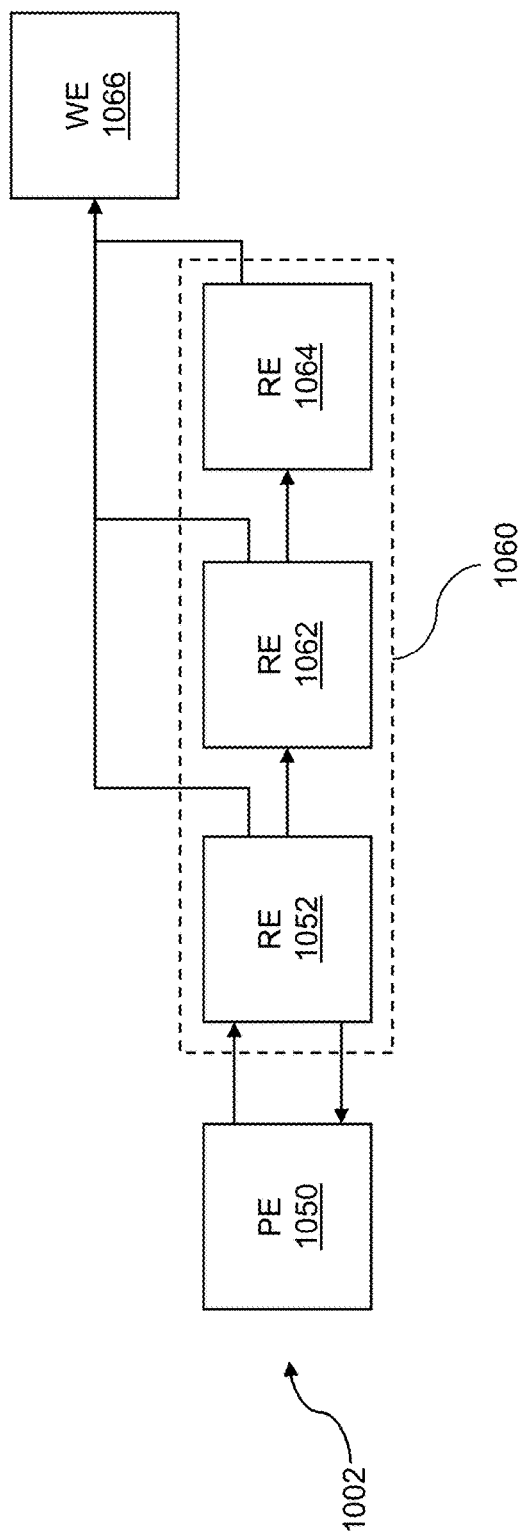
FIG. 10B illustrates a parallel configuration for multiple reads.

FIG. 10B illustrates a parallel configuration for multiple reads. In flow 1002, master switching element 1050 initiates a read operation to a first read switching element 1052, which in turn passes the read operation to a second read switching element 1062, which in turn passes the read operation to a third read switching element 1064. The three read elements 1052, 1062, and 1064 can be considered a group of switching elements 1060. Group 1060 can include any number of read switching elements. All three read elements of group 1060, namely read elements 1052, 1062, and 1064, provide a first data to be written into write switching element 1066. The operation can be hierarchically controlled from master switching element 1050. In this manner, triple redundancy of the first data is achieved for highly fault tolerant switching operation.

Figure 11:
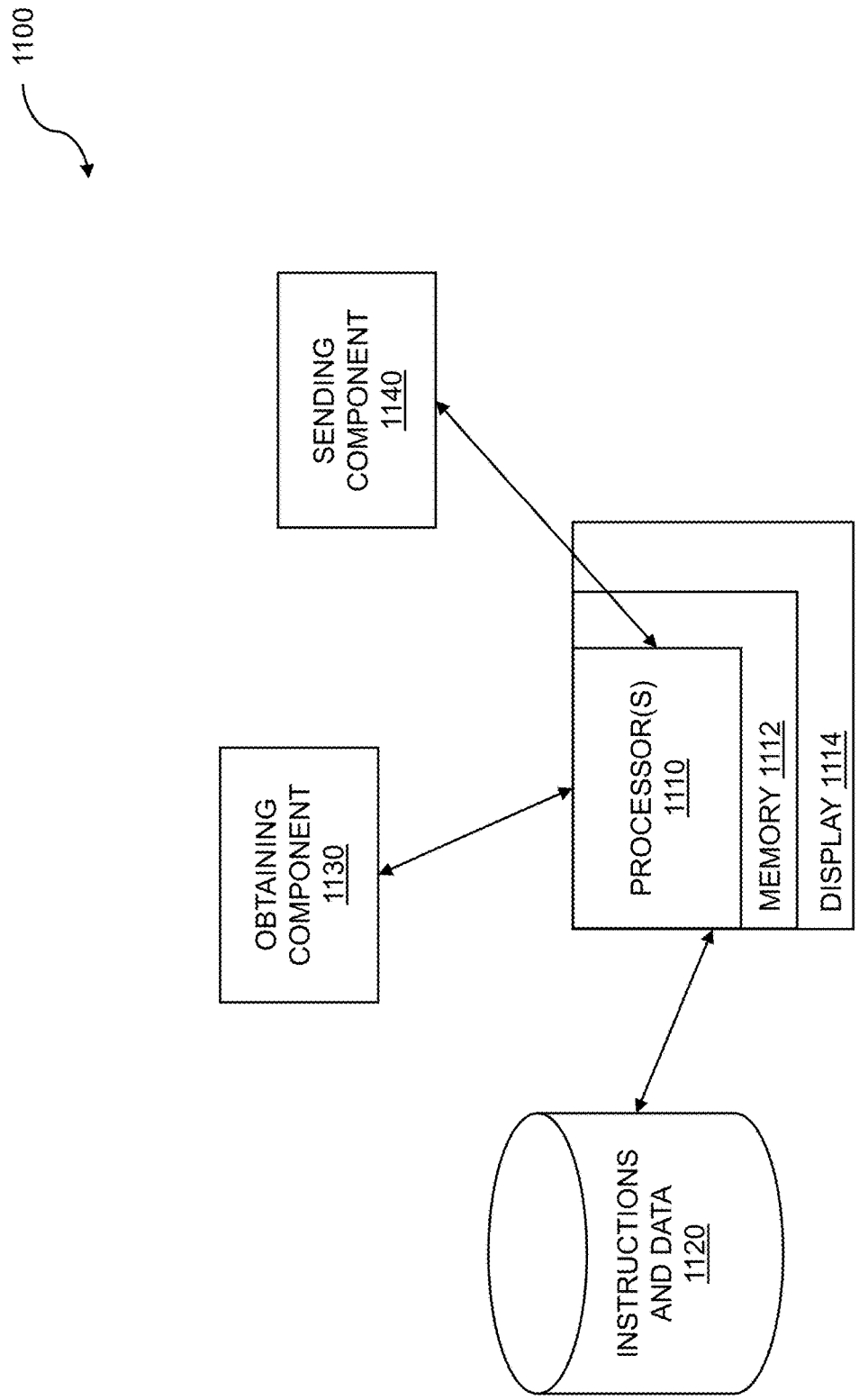
FIG. 11 is a system for data manipulation.

FIG. 11 is a system for data manipulation. Data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The system 1100 can include one or more processors 1110 coupled to a memory 1112 which stores instructions. The system 1100 can include a display 1114 coupled to the one or more processors 1110 for displaying data, intermediate steps, instructions, and so on. In embodiments, one or more processors 1110 attached to the memory 1112 where the one or more processors, when executing the instructions which are stored, are configured to: obtain data from a first switching element within a plurality of switching elements wherein the first switching element is controlled by a first circular buffer; and send the data to a second switching element within the plurality of switching elements wherein the second switching element is controlled by a second circular buffer. Instructions for programming circular buffers to control switching elements, and data for sending and receiving to and from the switching elements can be stored in an instructions and data store 1120. An obtaining component 1130 obtains data from a switching element where the obtaining can include a direct memory access (DMA). A sending component 1140 sends the data to a second switching element within the plurality of switching elements where the second switching element is controlled by a second circular buffer. The sending the data to the second switching element can include a DMA.

In embodiments, a computer program product embodied in a non-transitory computer readable medium for data manipulation, the computer program product comprising obtaining data from a first switching element within a plurality of switching elements wherein the first switching element is controlled by a first circular buffer; and sending the data to a second switching element within the plurality of switching elements wherein the second switching element is controlled by a second circular buffer.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a technique for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A processor-implemented method for data manipulation comprising:
   obtaining data from a first switching element within a plurality of switching elements wherein the first switching element is controlled by a first circular buffer; and
   sending the data to a second switching element within the plurality of switching elements wherein the second switching element is controlled by a second circular buffer,
   wherein a third switching element within the plurality of switching elements hierarchically controls the first switching element and the second switching element to perform a direct memory access (DMA) transfer.

2. The method of claim 1 wherein the plurality of switching elements comprises an asynchronous reconfigurable fabric.

3. The method of claim 2 wherein the asynchronous reconfigurable fabric is asynchronous with respect to system memory.

4. The method of claim 1 wherein the plurality of switching elements forms two or more clusters within a reconfigurable fabric.

5. The method of claim 4 wherein a cluster within two or more clusters is synchronized to a tic cycle boundary.

6. The method of claim 5 wherein the cluster within the two or more clusters and a second cluster within the two or more clusters operate on different tic cycles.

7. The method of claim 5 wherein the cluster within the two or more clusters and a second cluster within the two or more clusters operate on different tic clocks.

8. The method of claim 4 wherein the two or more clusters comprise a dataflow processor.

9. The method of claim 4 wherein the two or more clusters are initialized to perform an operation based on one or more agents defined in a software development kit (SDK).

10. The method of claim 1 further comprising a fourth switching element within the plurality of switching elements, wherein the fourth switching element is controlled by a fourth circular buffer.

11. The method of claim 10 wherein the first switching element reads a first data and writes the first data into the second switching element and the second switching element writes the first data into the fourth switching element.

12. The method of claim 11 wherein the fourth switching element sends acknowledgement to the third switching element after the first data is written to the fourth switching element.

13. The method of claim 10 wherein the third switching element further hierarchically controls the fourth switching element.

14. The method of claim 10 wherein the second switching element and the fourth switching element are connected in parallel with the first switching element.

15. The method of claim 1 wherein the obtaining data from a first switching element and the sending the data to a second switching element is autonomous of a third switching element within the plurality of switching elements.

16. The method of claim 1 wherein the data comprises a block of memory obtained from storage in the first switching element.

17. The method of claim 16 wherein the block of memory comprises a beginning address in the storage.

18. The method of claim 17 wherein the block of memory comprises an ending address in the storage.

19. The method of claim 18 wherein the obtaining is triggered by a start instruction stored in the first circular buffer.

20. The method of claim 1 further comprising routing the data through a fifth switching element within the plurality of switching elements wherein the fifth switching element is controlled by a fifth circular buffer.

21. The method of claim 20 wherein the fifth switching element is interposed between the first switching element and the second switching element.

22. The method of claim 1 wherein the first switching element and the second switching element comprise a return communication path to the third switching element.

23. The method of claim 22 wherein the first switching element transfers information from the second switching element to the third switching element on the return communication path.

24. A computer program product embodied in a non-transitory computer readable medium for data manipulation comprising code which causes one or more processors to perform operations of:
   obtaining data from a first switching element within a plurality of switching elements wherein the first switching element is controlled by a first circular buffer; and sending the data to a second switching element within the plurality of switching elements wherein the second switching element is controlled by a second circular buffer, wherein a third switching element within the plurality of switching elements hierarchically controls the first switching element and the second switching element to perform a direct memory access (DMA) transfer.

25. A computer system for data manipulation comprising:
a memory which stores instructions;
one or more processors attached to the memory wherein the one or more processors, when executing the instructions which are stored, are configured to:
  obtain data from a first switching element within a plurality of switching elements wherein the first switching element is controlled by a first circular buffer; and
  send the data to a second switching element within the plurality of switching elements wherein the second switching element is controlled by a second circular buffer,
  wherein a third switching element within the plurality of switching elements hierarchically controls the first switching element and the second switching element to perform a direct memory access (DMA) transfer.

* * * * *